US012467315B2

(12) United States Patent
Johns et al.

(10) Patent No.: US 12,467,315 B2
(45) Date of Patent: Nov. 11, 2025

(54) SMART LADDER

(71) Applicant: USS Veteran Services Company LLC, Louisville, KY (US)

(72) Inventors: Clifford L Johns, Louisville, KY (US); Steven W Brewer, New Albany, IN (US); David Dingman, Louisville, KY (US)

(73) Assignee: USS Veteran Services Company LLC, Louisville, KY (US)

( * ) Notice: Subject to any disclaimer, the term of this patent is extended or adjusted under 35 U.S.C. 154(b) by 1032 days.

(21) Appl. No.: 17/404,259

(22) Filed: Aug. 17, 2021

(65) Prior Publication Data

US 2022/0065043 A1 Mar. 3, 2022

Related U.S. Application Data

(60) Provisional application No. 63/071,437, filed on Aug. 28, 2020.

(51) Int. Cl.

*E06C 7/00* (2006.01)
*E06C 1/06* (2006.01)
*E06C 1/12* (2006.01)
*E06C 1/38* (2006.01)
*E06C 7/12* (2006.01)

(52) U.S. Cl.

CPC ................ *E06C 7/003* (2013.01); *E06C 1/38* (2013.01); *E06C 7/12* (2013.01); *E06C 1/06* (2013.01); *E06C 1/12* (2013.01)

(58) Field of Classification Search

CPC ... E06C 7/003; E06C 1/38; E06C 7/12; E06C 1/06; E06C 1/12; E06C 1/04

See application file for complete search history.

(56) References Cited

U.S. PATENT DOCUMENTS

| | | | | | |
|---|---|---|---|---|---|
| 4,311,208 | A * | 1/1982 | Macrorie | E06C 7/003 | 182/39 |
| 4,848,138 | A * | 7/1989 | Marshall | G01M 3/20 | 73/40 |
| 5,954,154 | A * | 9/1999 | Ziolkowski | E06C 7/003 | 182/129 |
| 6,657,547 | B2 * | 12/2003 | Ching-Yao | E06C 7/003 | 182/27 |
| 6,966,403 | B1 * | 11/2005 | Chandra | E06C 7/003 | 182/129 |
| 9,711,028 | B1 * | 7/2017 | Friedman | G08B 21/0461 | |
| 10,260,282 | B1 * | 4/2019 | Bautista | G01L 1/005 | |
| 11,499,370 | B2 * | 11/2022 | Haynes | E06C 7/003 | |
| 11,788,353 | B2 * | 10/2023 | Clark | E06C 1/20 | 182/18 |
| 2005/0173189 | A1 * | 8/2005 | Berardi | E06C 7/003 | 182/129 |
| 2010/0018800 | A1 * | 1/2010 | Ventura | E06C 7/003 | 340/686.1 |
| 2010/0295751 | A1 * | 11/2010 | Sheers | H01Q 1/10 | 343/901 |
| 2013/0113617 | A1 * | 5/2013 | Wang | E06C 7/003 | 340/521 |

(Continued)

*Primary Examiner* — Daniel J Rohrhoff

(74) *Attorney, Agent, or Firm* — Duncan Galloway Greenwald PLLC; Kevin T. Duncan

(57) ABSTRACT

A ladder including sensors, a controller, and output signals to alert the user to operating conditions and to aid the user in the safe operation of the ladder.

20 Claims, 20 Drawing Sheets

(56) References Cited

U.S. PATENT DOCUMENTS

| | | | | |
|---|---|---|---|---|
| 2013/0140111 | A1* | 6/2013 | Desai | E06C 7/003 182/129 |
| 2015/0114755 | A1* | 4/2015 | Eames | E06C 1/38 182/207 |
| 2018/0112464 | A1* | 4/2018 | Tang | E06C 7/50 |
| 2019/0345767 | A1* | 11/2019 | Heinbuch | E06C 7/003 |

* cited by examiner

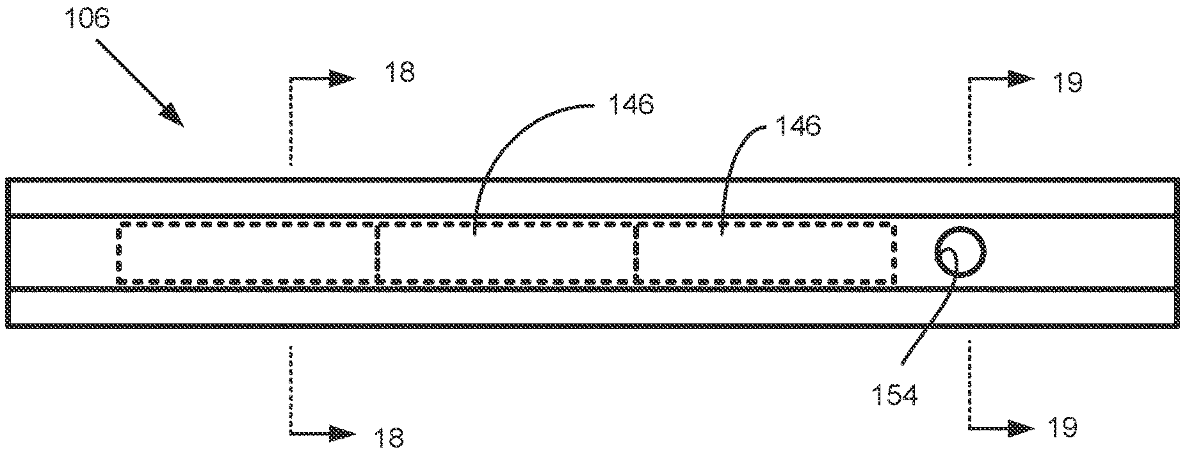
Fig 17
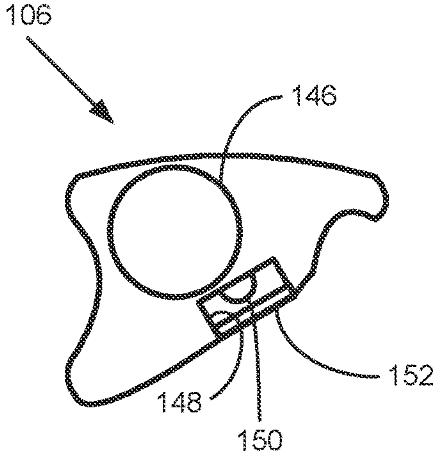
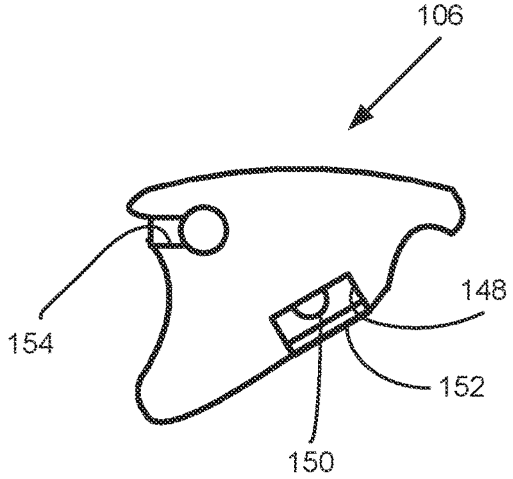
Fig 18
Fig 19

SMART LADDER

This application claims priority from U. S. Provisional Application Ser. No. 63/071,437 filed Aug. 28, 2020, which is hereby incorporated herein by reference.

BACKGROUND

The present invention relates to a ladder.

SUMMARY

The present ladder may incorporate a tilt sensor to determine whether the ladder is leaning within a desired range of angles to minimize slipping or tipping of the ladder, and this sensor may cause the ladder to generate a signal to the user. Lights may be included to make the ladder visible in a dark area (such as in a confined space) as well as to light up the surrounding area. Electrical outlets may be included on the ladder to power tools, lights, or other equipment. A tray may be provided to hold tools and hardware; the tray includes a magnetic strip to hold things like screws, nails, and screwdrivers. Sensors may sense when the user has reached the bottom rung of the ladder and may cause the ladder to generate a signal to the user so he will know not to step off the ladder before he has reached that bottom rung.

Additional features may be provided to facilitate ingress and egress from an OSHA-permit-required confined space, particularly through a manway into the confined space. In an OSHA-permit-required confined space, there is a permitting process that is used to ensure the space is safe to enter and work in. Some of the equipment needed in such spaces includes, but is not limited to, atmospheric sampling of up to four (4) gases (Oxygen, Carbon Monoxide, Sulphur Hexafluoride, and Methane or a Lower Explosion Level gas), temporary lighting, camera, communication device, power cables for tools used inside, and temporary ventilation ducts and hoses. These items clog the entry to the space. The entry is often also the exit. The clogging results in congestion, causing normal entry and exit to take longer. In some cases, entrants have become injured because they fell after getting tied up with various hoses and cords in a manway, and the delays are a serious problem in the event of an emergency such as a fire, noxious gas release, lightning strikes in the area, or other hazards. This ladder eliminates some of the clutter by incorporating and consolidating equipment into the ladder itself.

BRIEF DESCRIPTION OF THE DRAWINGS

FIG. 17 is a front section view of a rung of the ladder of FIG. 11 taken along the line 17-17;

FIG. 18 is a section view along line 18-18 of FIG. 17;

FIG. 19 is a section view along line 19-19 of FIG. 17;

DESCRIPTION

FIGS. 1-10 show a ladder 10. The ladder 10 includes left and right uprights 12 and 14 (also referred to as rails or side rails) and a plurality of horizontal rungs 16 extending between and connecting the uprights 12, 14. The ladder 10 preferably is manufactured from a relatively lightweight, non-deteriorating, and electrically-insulating material, such as fiberglass, though in certain instances aluminum, steel, or other materials may be used.

Figure 4:
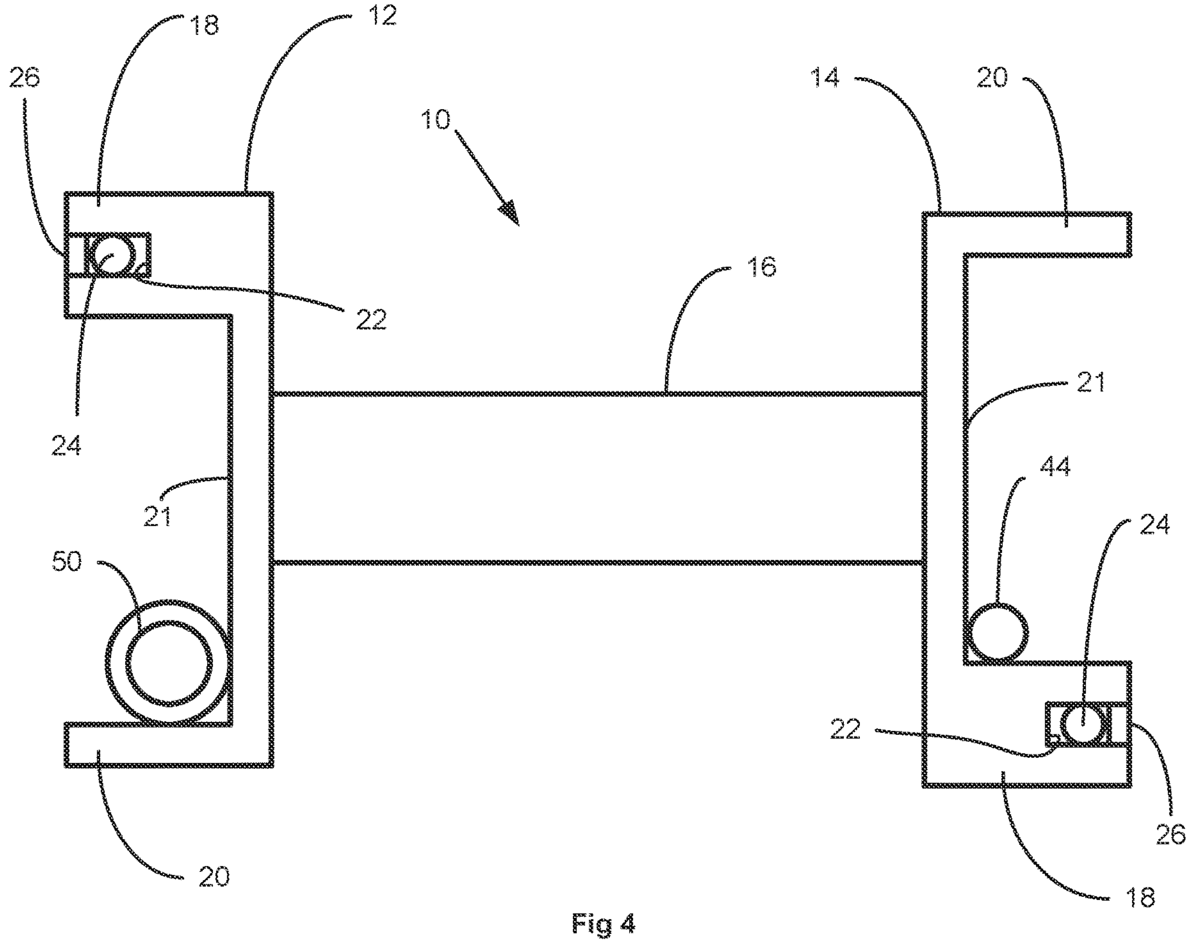
FIG. 4 is a plan view of the ladder of FIG. 1.

As best appreciated in FIG. 4, each upright 12, 14 has a substantially "C" shaped cross-sectional profile along its full length, with first and second outwardly-projecting legs 18, 20, connected together by a spanning leg 21. The first leg 18 is thicker than the second leg 20. Each first leg 18 defines a longitudinal cavity 22 extending substantially the full length of the upright 12, 14. Housed within each longitudinal cavity 22 is an LED (Light Emitting Diode) light strip 24 (See also FIG. 2) to help make the ladder 10 more visible. The light strip 24 not only makes the ladder 10 more visible; it also provides ambient lighting. The open outer edge of the cavity 22 is closed off with a lens 26, such as a polycarbonate strip, both to protect the light strip 24 and to diffuse the light emanating from the cavity 22.

The light strips 24, and all other electrical components (unless otherwise stated), may be battery operated. The battery (batteries) 146 (shown in FIG. 17) may be placed inside one or more of the horizontal rungs or inside one (or both) of the uprightsl2, 14. The battery may be a rechargeable battery, and the ladder 10 may be provided with a battery charging station (not shown) which is automatically energized when the ladder 10 is plugged into an electrical cord, as explained in more detail later. Some, or all, of these electrical components also may be operated directly from an external power source, which may be direct current (DC) or alternating current (AC). The transition from battery operation to operation from the external power source may be accomplished either manually or automatically, as desired.

Figure 2:
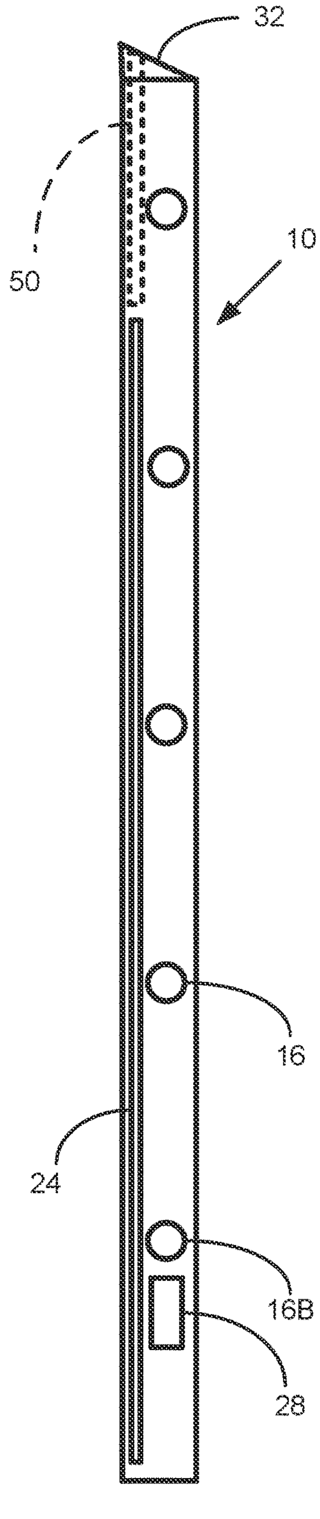
FIG. 2 is a left side view of the ladder of FIG. 1.
Figure 1:
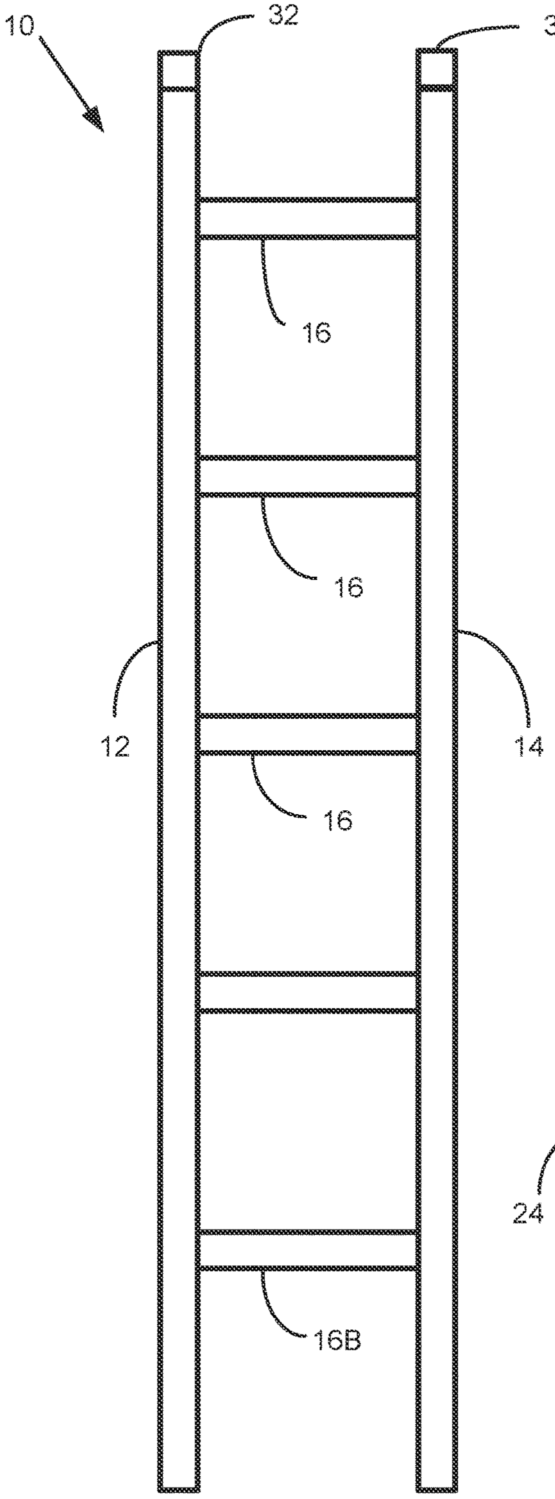
FIG. 1 is a front view of a ladder including many of the features described above (with the top tray omitted for clarity)
Figure 3:
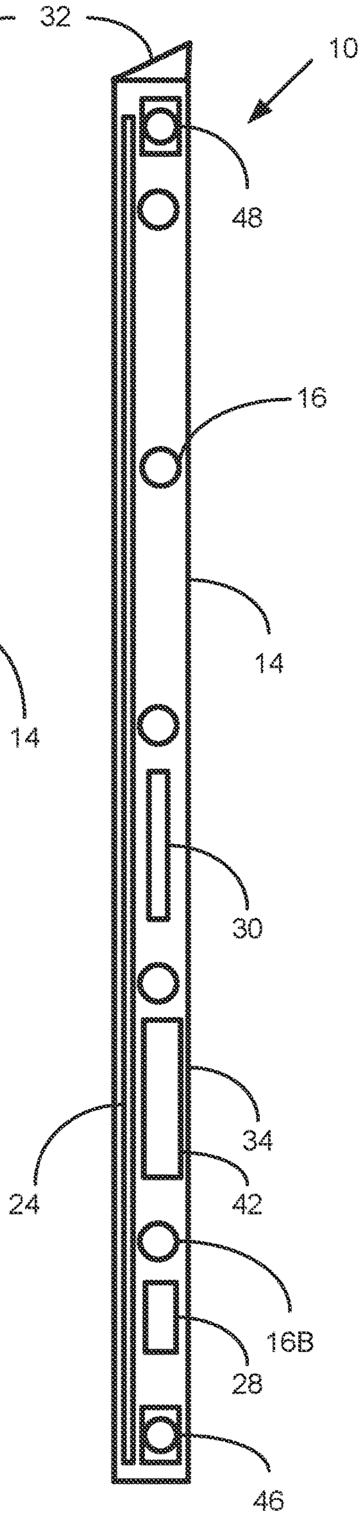
FIG. 3 is a right side view of the ladder of FIG. 1.

As shown in FIGS. 2 and 3, each of the uprights 12, 14 houses a load cell 28 to detect the weight on the ladder. These load cells 28 monitor the full load on the ladder 10, including the user and any gear the user is carrying with him (hoses, tools, equipment, consumables, etc.). The load is transmitted to a controller (not shown), preferably located on the ladder, which compares the load against a specification to ensure that the maximum weight rating of the ladder 10 is not exceeded. Should the weight detected by the load cells 28 exceed the weight rating of the ladder 10, the controller may be programmed to generate an output signal to alert the user. The output signal may include an audible alarm mounted on the ladder, a vibrator mounted on the ladder that vibrates the ladder when activated, lights (such as the light strips 24) which may be flashed on and off, may change color, etc. The output signal also may include transmitting wirelessly to an external receiver, such as a central station or a smart phone. Note that any and all of these alarm outputs also may be used to alert the user of any other condition detected by the ladder 10, as discussed in more detail later.

The output signal may be customized to alert the user to a particular safety concern. For instance, the lights may flicker at different intervals, or may even change color, to designate specific alarms, as explained in more detail later. A color such as green may be used to indicate that the user has reached the bottom rung on the ladder 10 and may therefore safely step down to the ground. Another color, such as red may be used to indicate an unsafe angle of repose of the ladder 10 (too steep or too shallow) and thus the user should not climb the ladder 10 until it has been repositioned to the correct angle α (See FIG. 10). In addition, or alternatively, various sounds or other outputs may be used to indicate various conditions, such as a high pitched sound to indicate an unsafe angle, a pleasant musical tone to indicate contact with the bottommost rung, a different pitch of sound to indicate a different condition, etc.

The load cells 28 also monitor the weight on each upright 12, 14 of the ladder 10. Again, this information is transmitted to the controller, which compares the weight on each upright 12, 14 and may activate an output to alert the user if one of the uprights 12, 14 appears to be handling an excessively larger portion of the total weight than the other. Ideally, the weight should be evenly distributed between each of the uprights 12, 14. If the load cells 28 detect an excessive variance in the weight distribution between the uprights 12, 14, this may indicate that the soil (or flooring) under one of the uprights 12, 14 is not sufficiently compacted and is about to yield. Upon receiving an output signal indicating an excessive variance in loads, the user then can descend and get off of the ladder 10 and ensure that both uprights 12, 14 are properly supported before getting on the ladder again.

At least one of the uprights 12, 14 defines a through opening 30 in the spanning member 21 (See FIG. 3) which is large enough to permit a person's fingers to extend through in order to be used as a handle to transport the ladder 10. The location of the opening 30 is carefully selected to ensure that the ladder 10 is substantially balanced when picked up by the user at the opening 30. The dimensions of the opening 30 are such that the user may pick up the ladder with a gloved hand.

The top end of each upright 12, 14 defines a sloped surface or wedge 32 (See FIGS. 2, 3, and 10) which is cut at a 4:1 ratio (the length is 4 times the height) such that, when the ladder 10 is upright at a correct and safe angle α (Note: at a 4:1 ratio the angle α is approximately 76 degrees) (See also FIG. 10), the top surface of each upright 12, 14 is substantially horizontal.

As indicated earlier, the angle α between the ladder 10 and a horizontal support surface, such as the floor or the ground (See FIG. 10) should be approximately 76°, and preferably between 70° and 82°. The ladder 10 includes a tilt sensor 34, typically a low frequency-response or DC-response accelerometer 34 (See FIG. 3), which is aligned to the linear axis of the ladder so that, when the ladder is used, it monitors the angle α of the ladder 10 relative to horizontal and transmits that angle to the controller, which generates an output signal to alert the user if this angle α is not within the desired range. As indicated earlier, the output signal may be visual (lights flashing and/or changing color), audible (buzzer or beeper), and/or sensed by touch (vibrating), and these outputs may be continuous or of varying frequency to alert the user to different ladder conditions prior to stepping onto the ladder, while using the ladder, and before stepping off.

Figure 8:
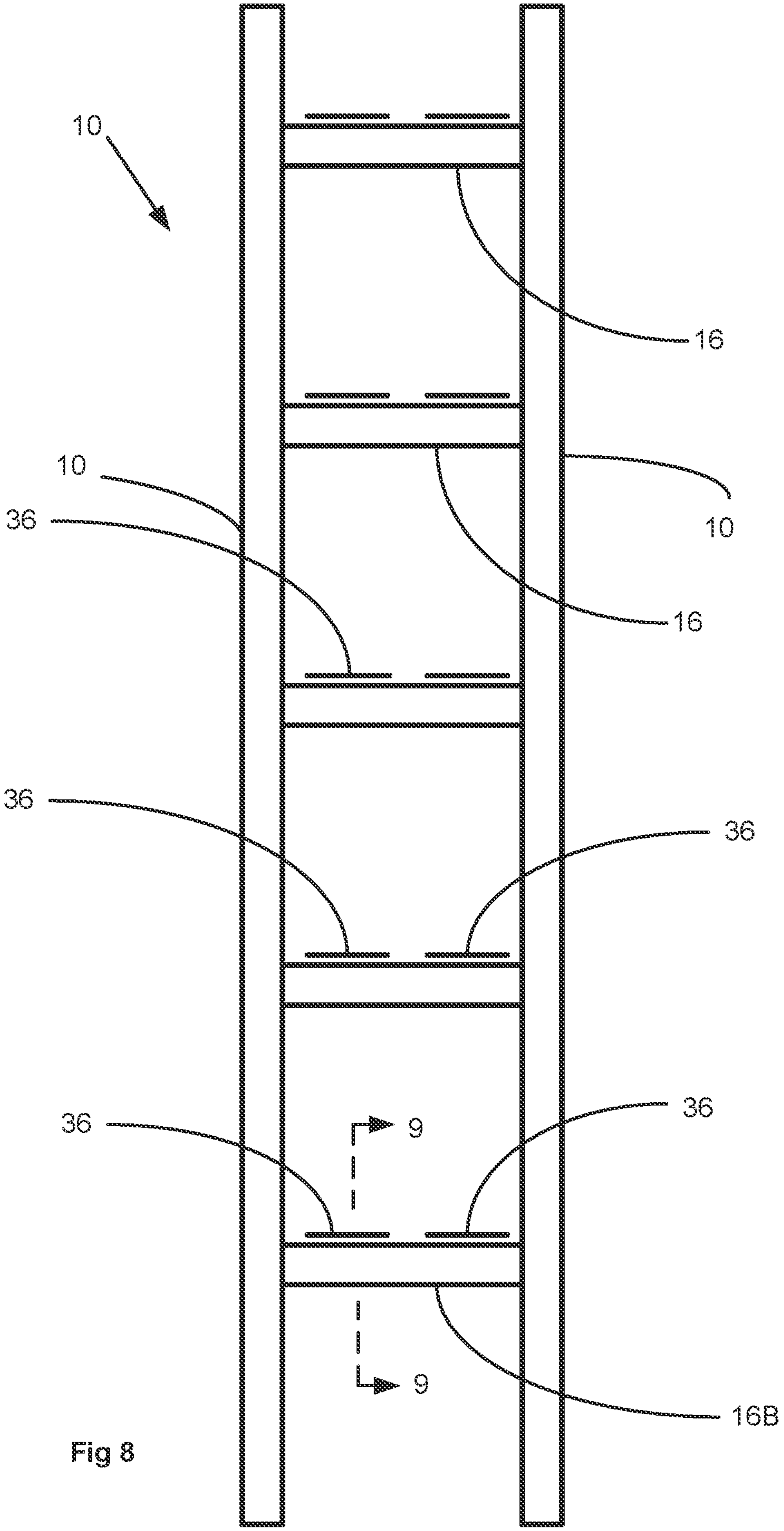
FIG. 8 is a front view of the ladder of FIG. 1 but including piezoelectric sensors to sense the location of the user's feet and hands in contact with the ladder when climbing or descending.
Figure 9:
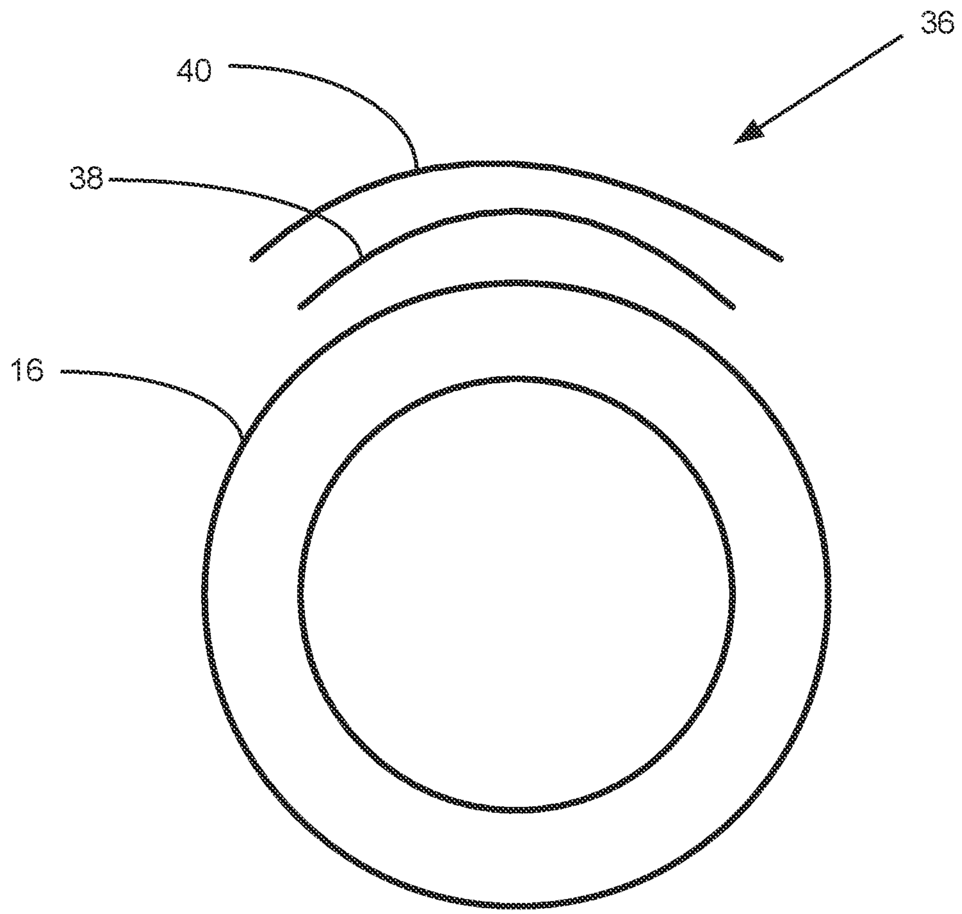
FIG. 9 is a schematic exploded section view along line 9-9 of FIG. 8.
Figure 10:
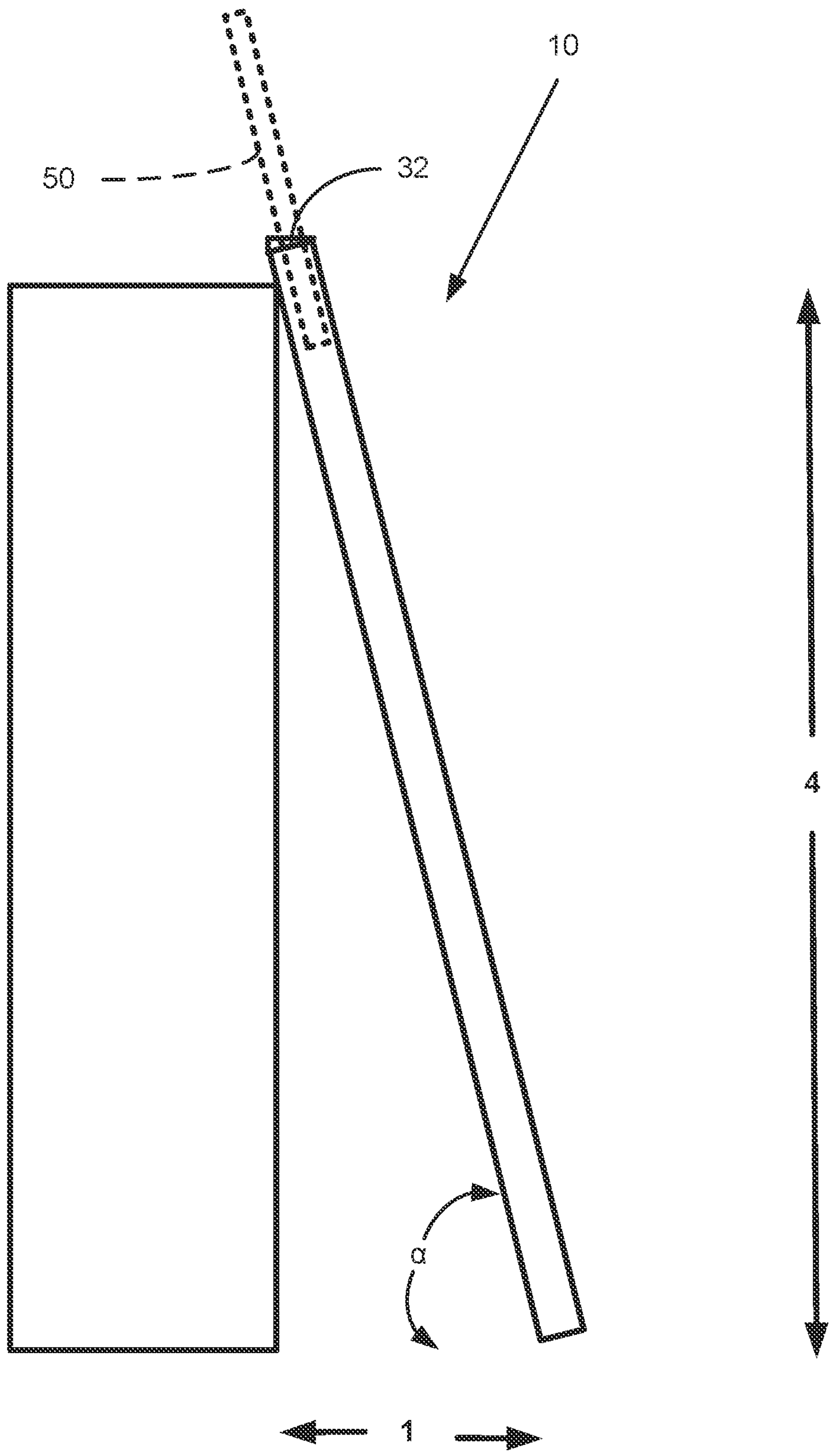
FIG. 10 is a schematic showing the recommended leaning angle for a ladder against a wall or other support.

FIG. 8 is a front view of the ladder 10, showing the placement of a plurality of contact sensors 36 on the rungs 16. (The bottom rung is labelled as 16B.) In this embodiment, and as shown in FIG. 9, each contact sensor 36 is a piece of piezoelectric film 38 mounted on a rung 16,16B and is covered by a protective cover 40. A piezoelectric sensor is a device that uses the piezoelectric effect to measure changes in pressure by converting them to an electrical charge. The contact sensors 36 on the bottommost rung 16B (See FIG. 1) sense when the user has reached the bottommost rung 16B. An optical transmitter and receiver 195 (See FIG. 16), located on the uprights 12, 14 (or 102, 104), about one inch above the top surface of the bottommost rung 16B also can be used to detect when the user is in contact with the bottommost rung 16B. When the sensor 38 and/or 195 senses that the user has reached the bottommost rung 16B, then it is safe for the user to step off the ladder 10 and onto the ground. The contact sensor 36 or the optical receiver 195 sends a signal to a controller 42 shown in FIG. 3, so the controller 42 knows whether the user is on the bottommost rung 16B. The controller generates an output signal to the user to indicate whether the user is on the bottommost rung 16B, so the user knows when it is safe to step off the ladder. The output may be a short beep or other sound, a green light at the user's eye level to indicate that the user is in contact with the bottommost rung or a red light to indicate that the user is not in contact with the bottommost rung, or some other desired output signal. Note that this signal, especially if it is a sound, may be timed to be of relatively short duration so that it will not annoy the user when he is purposely standing on the bottommost rung 16B for a prolonged period of time.

In this embodiment, the controller 42 is located in the same area as the tilt sensor. The battery, the battery charger, and the electronics to automatically switch over from battery power to external power may be located in this same area.

The additional contact sensors 36, located on several, if not all, of the other rungs 16, may be used as a training aid to help the user learn the safe way to use a ladder. A user should maintain a 3-point (two hands and a foot, or two feet and a hand) contact on the ladder when climbing. The contact sensors 36 may transmit signals to the controller to permit the controller to monitor the presence of the 3-point contact at all times by the user. The controller also can log and transmit the 3-point contact data along with time/date data so it can be graphically displayed on an output device (near the ladder or remote from the ladder) to display the progress of the user and how the user manages the 3-point of contact goal while ascending and descending the ladder during training exercises and regular use. The controller 42 may activate an output signal(s) to alert the user as to whether the user is in 3-point contact with the ladder. The signal may be of short duration so as not to annoy the user when the user is deliberately standing on a rung of the ladder and using his hands to perform some operation other than ascending or descending the ladder.

Referring to FIG. 4, one of the two uprights 12, 14 (in this embodiment the right upright 14) houses an electrical extension cord 44 extending lengthwise along the ladder 10. A male power cord plug receptacle 46 (See FIG. 3) is located at the bottom of the upright 14 and a female power cord plug GFCI receptacle 48 is located at the top of the upright 14. (The power cord alternatively may have a reverse orientation, allowing for power input at the bottom and output at the top, and there may be additional power cords within the ladder to permit output at other desired locations.) The extension cord 44 may be plugged into an external power source via the male plug 46, and any electrical accessories, such as power tools, lights, and battery chargers, may be plugged into the female plug 48. As indicated earlier, once the extension cord 44 has been plugged into an AC power source, the electrical/electronic devices on the ladder 10 may switch from battery power to AC power. This switch may be accomplished manually or automatically.

A telescoping mast 50 (See FIGS. 2, 4 and 10) is housed on the upper end of the upright opposite the upright that houses the extension cord 44 (in this instance, the left upright 12). The mast 50 is shown, in phantom, in its stowed position in FIG. 2 and in its extended position, again in phantom, in FIG. 10. The user slides the mast 50 up above the upper end of the ladder 10 so he may use it as a handle/support on which to stabilize himself as he steps up above the end of the ladder 10 and onto a roof or platform, for instance. The mast 50 may be locked in its extended position by any of a number of means, for example, by simply twisting the mast 50 along its longitudinal axis until the mast 50 locks up against its own slide mechanism.

Figure 5:
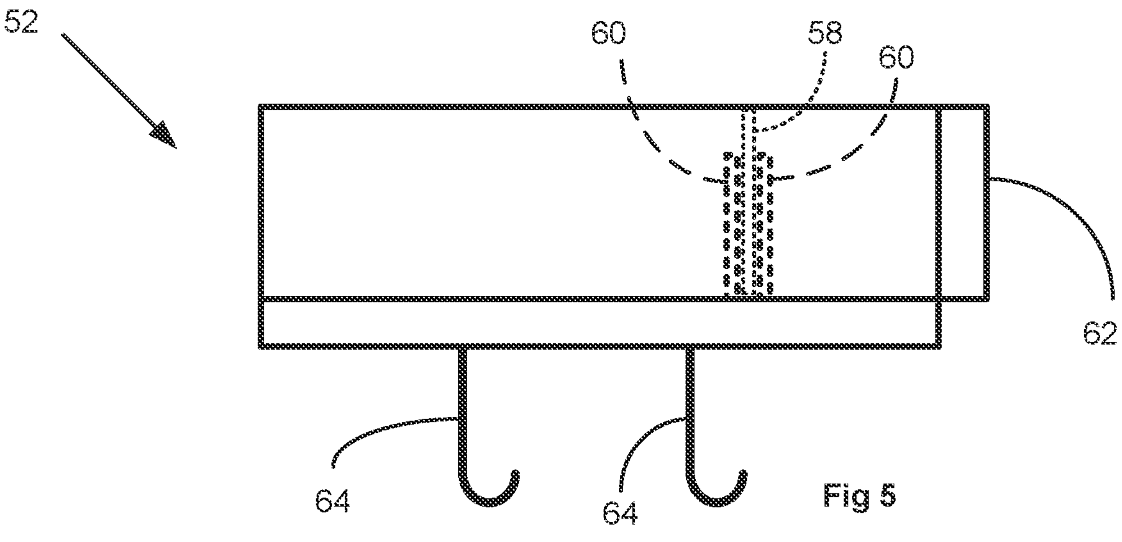
FIG. 5 is a side view of a tray which may be mounted on the upper portion of the ladder of FIG. 1.
Figure 6:
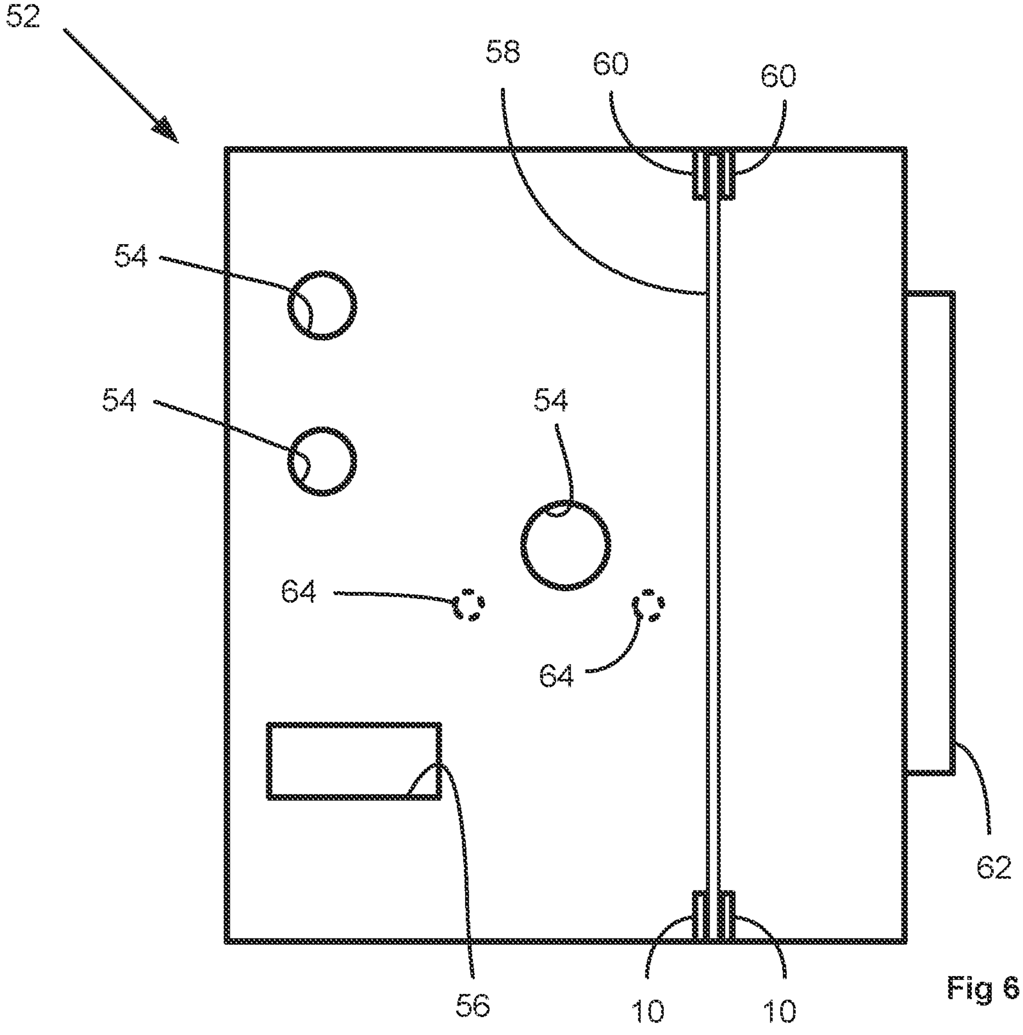
FIG. 6 is a plan view of the tray of FIG. 5.

Referring to FIGS. 5 and 6, a tray 52 may be mounted on top of the ladder 10, resting atop the wedges 32. The tray 52 may be secured by any known means including bolts, clamps, magnets, or industrial strength hook and loop fasteners (not shown). The tray 52 defines a plurality of through openings 54, 56 to receive tools (not shown) such as screwdrivers and wrenches. The tray surface is divided by an easily removable wall 58 which may be lifted out from between wall guides 60. A magnetic strip 62 provides an additional place for temporarily holding tools, such as screwdrivers. Beneath the tray 52, a plurality of hooks 64 may be used to hold hanging items such a can of paint and the like.

Figure 7:
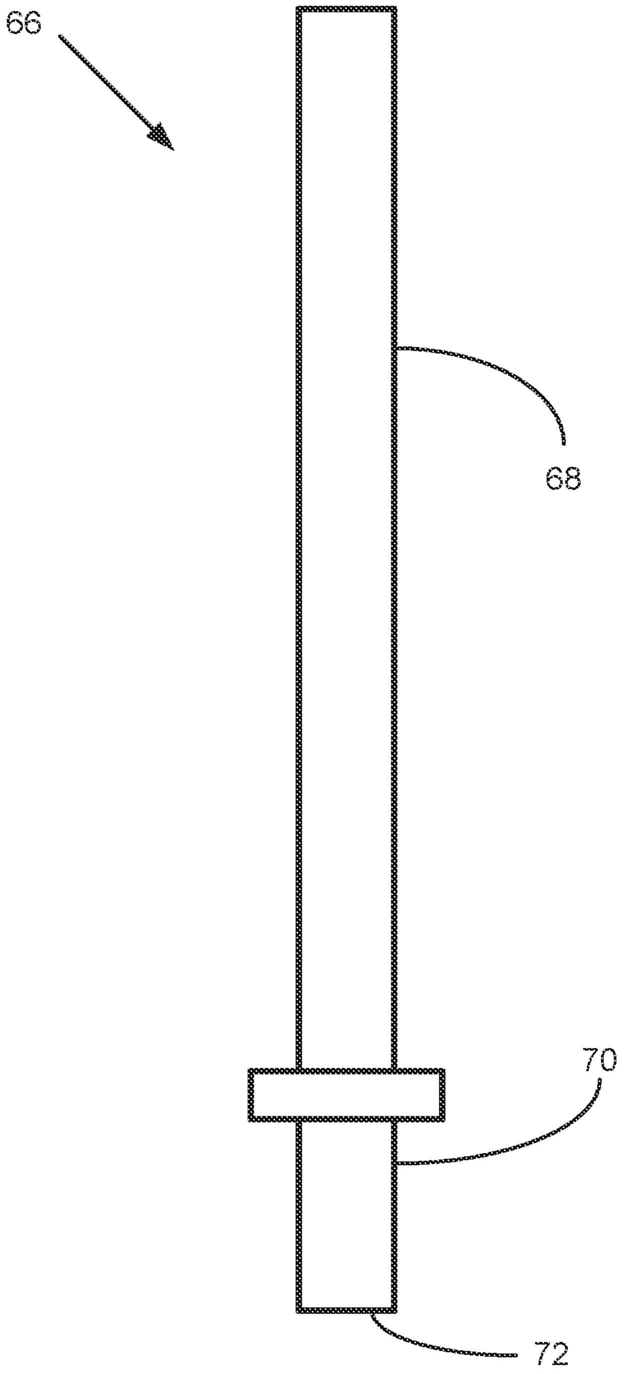
FIG. 7 is a side view of a light which may be plugged into the power outlet of the ladder of FIG. 1.

FIG. 7 shows a plug-in saber light fixture 66 which is commercially available. This saber light 66 features a bright LED portion 68, and a rubberized handle 70 provides a non-slip grip including a male plug 72 at the grip end so it may be plugged into the female electrical plug 48 (See FIG. 3) to charge its on-board battery or to light up the environment while plugged into the ladder's outlet. This is just one example of a tool which may be plugged into the ladder's electrical outlet. Any other corded or cordless tools may be plugged in to take advantage of this feature on the ladder 10.

The controller causes the light strip 44 on the ladder 10 to light up when sensors on the ladder 10, such as the accelerometer 34 (see FIG. 3) detect that the ladder is being moved. This is a safety feature to illuminate the area where the ladder 10 is being moved and to illuminate the ladder 10 itself so it is more visible to personnel around the area where the ladder 10 is being moved. In a preferred embodiment, the ladder 10 is sealed to be sufficiently water-proof for "spray-down" and wash-down".

It should be noted that, unless otherwise stated, all the features disclosed with respect to this embodiment of the ladder 10 also apply, or may apply, to alternative embodiments described later in this specification.

Figure 11:
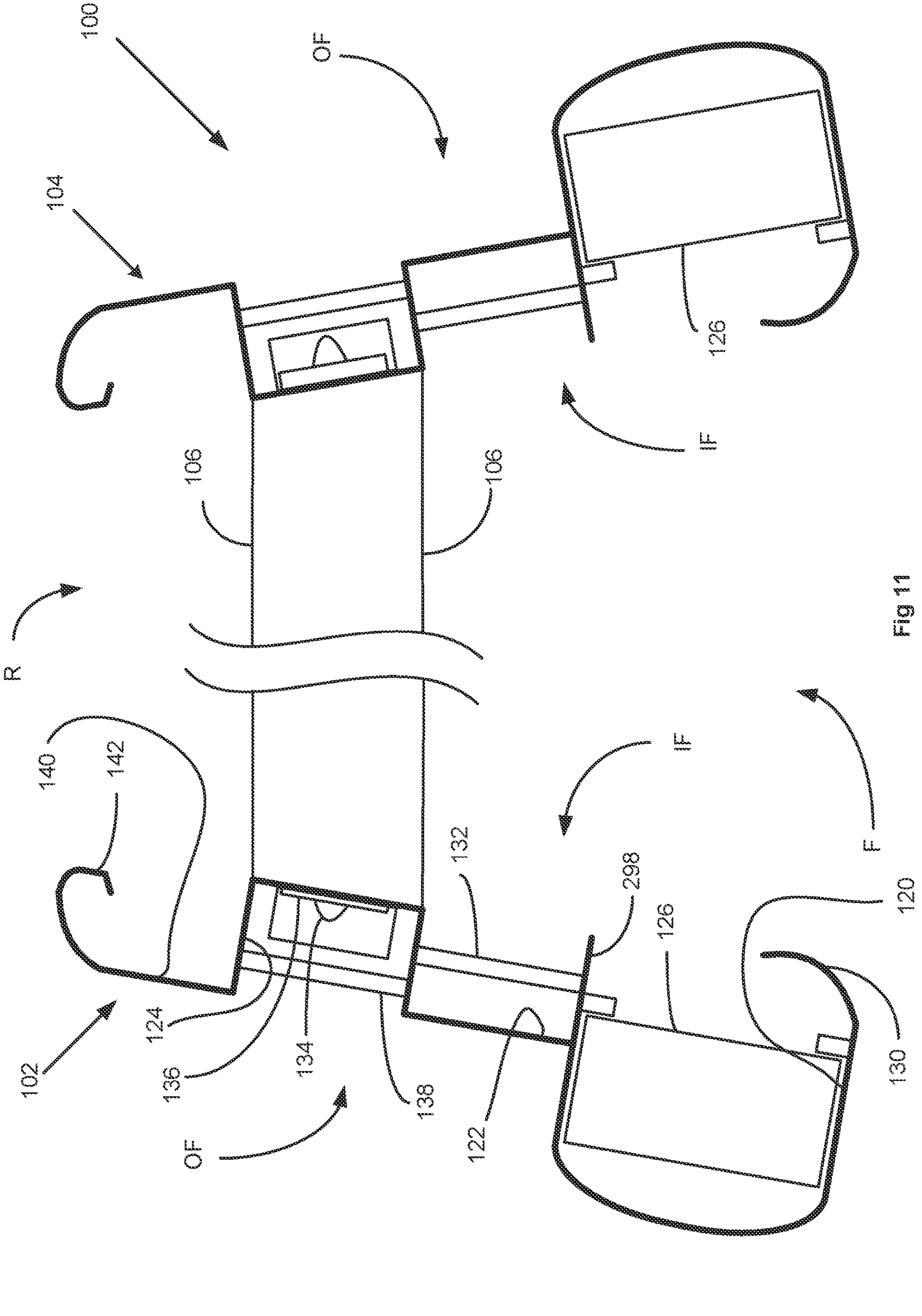
FIG. 11 is a plan view of an alternative embodiment of a ladder.
Figure 12:
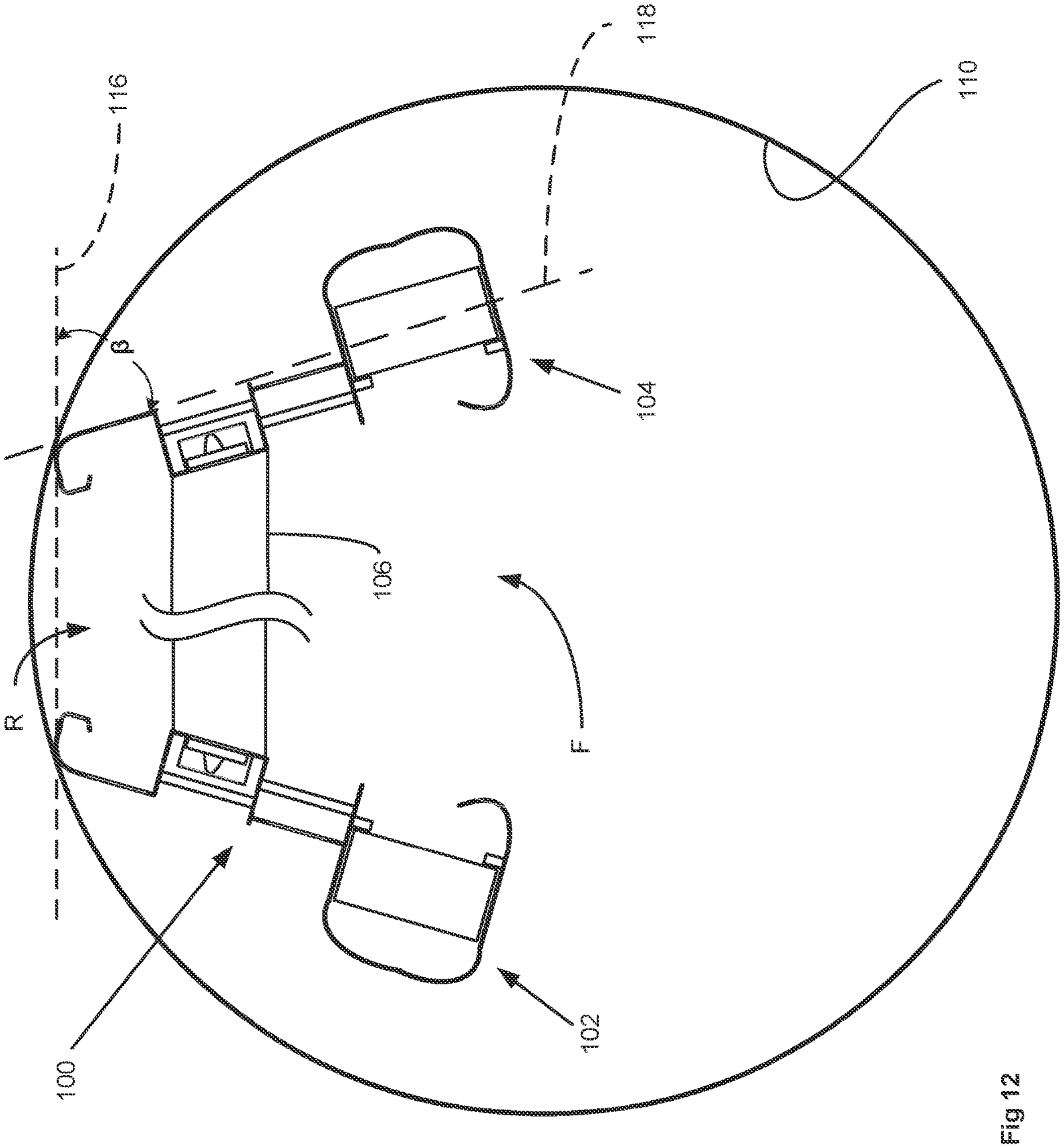
FIG. 12 is a plan view of the ladder of FIG. 11 as it projects through a manhole.
Figure 13:
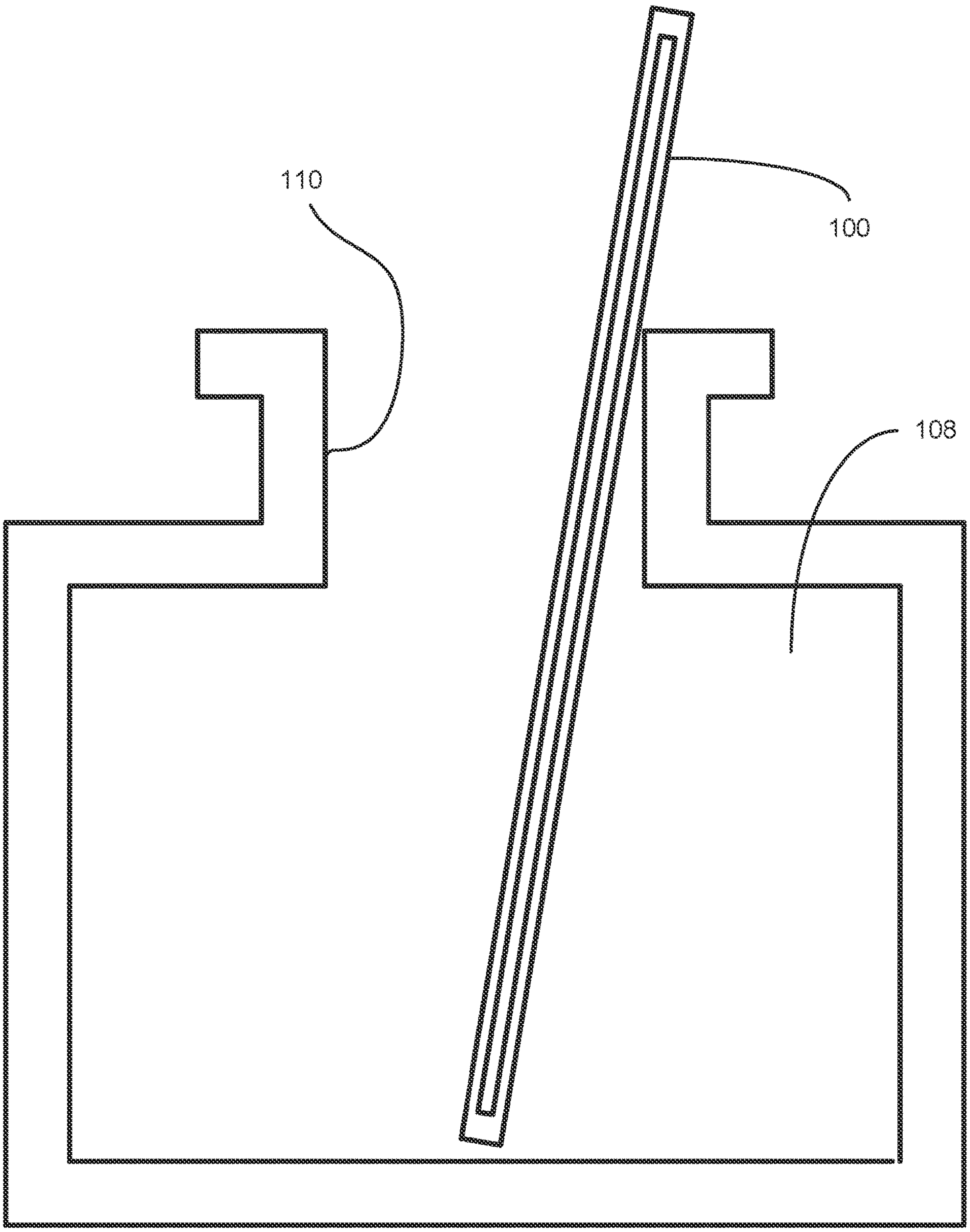
FIG. 13 is a side view of the ladder of FIG. 11 set up to be inserted downwardly into a confined space.

FIGS. 11-29 show an alternative smart ladder 100. Referring to FIGS. 11-13, the ladder 100 includes left and right uprights 102, 104 and a plurality of rungs 106 spanning between and connected to the uprights 102, 104. The frames for the uprights 102, 104 preferably are mirror images of each other, even though items housed in those frames are most likely substantially different from each other, as described in more detail below.

Referring to FIG. 11, in order to establish a common terminology, the front or entry side of the ladder is designated as "F", the rear side of the ladder as "R", the outward-facing side of each upright 102, 104 as "OF", and the inward-facing side of each upright 102, 104 as "IF". As will become clearer later on, this ladder 100 is designed to have a front-only use side, and it is particularly useful for entry into or egress out of an OSHA-permit-required confined space, such as the confined space 108 in FIG. 13 (which shows the ladder 100 being used for going downwardly into the confined space 108 through a manhole 110) or the confined space 112 in FIG. 14 (which shows the ladder 100 being used for going upwardly into the confined space 112 through a manhole 114).

FIG. 12 is a plan view of the arrangement shown in FIG. 13, wherein the ladder 100 is used to go downwardly into the confined space 108 through the circular opening of the manhole 110. This ladder 100 differs from the first embodiment 10 in a few ways. First, the uprights 102, 104 are canted so that the uprights diverge from each other on the front side and converge on the rear side. (The angle β between an imaginary line 116 lying parallel to the rungs 106 and an imaginary line 118 extending from the front edge to the rear edge of each upright 102, 104 is less than 90 degrees.) This provides the user with maximum access to the ladder on the front side and keeps the user as close as possible to the supporting wall of the manhole opening 110. This canted configuration creates a throat in the front side "F" of the ladder 100 that is more open than in the rear side "R". This allows the user to place his feet more easily onto the rungs 16 from the front side F. It also guides the user's feet into a better alignment condition with the rung 106 prior to ascending or descending the ladder 100. Canting creates more of an open space for the user as he goes through the manway 110 and allows the torso of the user to get closer to the supporting wall and more engaged with the ladder 100 than is possible with standard ladders. This helps the user pass through a manway 110 or other obstruction that limits space around the ladder 100.

A second difference is that the rungs 106 do not lie in the middle of the uprights 102, 104, but rather are offset in the rearward direction relative to the uprights 102, 104. That is, the rungs 106 are closer to the non-entry or rear side "R" of the ladder 100 than they are to the entry or front side "F" of the ladder 100. Offsetting the rungs 106 allows the user to get closer to the longitudinal center of the ladder 100, which increases the clearance between the user and a manway or other obstruction, allowing the user to pass through more easily and faster. It is important to be able to exit confined spaces quickly when conditions such as lightning strikes or a nearby hazardous vapor release exist, and the canting and offset features of this ladder 100 assist in allowing personnel to exit a confined or other work area quickly and easily.

FIG. 11 shows the profiles of the uprights 102, 104 in bold. Looking at the left upright 102 (the right upright 104 has a profile that is a mirror image of the left upright 102), the profile defines first, second and third cavities 120, 122, 124, respectively.

Since the cavities 120, 122, 124 of the profile extend for the length of the respective uprights, they form channels along the length of the uprights 102, 104. The first and second cavities 120, 122 open inwardly. The third cavity 124 opens outwardly. The first cavity 120 may be used to house, support, and guide sets of bearings 126 for the mobile cargo tray 128 shown in FIGS. 24-26. A curved lip 130 at the front of the first cavity 120 partially closes off the first cavity 120 and may be used as a handle to pick up the ladder 100, even when wearing gloves. This same curved lip 130 (See also FIG. 20) may be used to provide a fifth point of contact on the ladder by using it as a brace with the forearm 112, as explained in more detail later. This is an inward-facing "IF" cavity 120; that is, it is open to the inside face of the ladder 100.

The second cavity 122 may be used to house electrical wiring and/or to house conduits for compressed air or sampling air for gas monitors, as needed and as described in more detail later. This is also an inward-facing "IF" cavity, that is, it is open to the inside of the ladder 100. This cavity 122 is closed off with a barrier strip 132 which extends the length of the cavity 122. The cavity 122 may be potted to fully enclose and seal off the cavity 122 to make it a watertight cavity 122.

The third cavity 124 is an outward facing "OF" cavity and is used to house LED lighting strips 134 which are mounted on a circuit board 136 controlled by a controller, as described later. This third cavity 124 is closed off with a barrier strip 138 which extends along the length of the cavity 124 and is potted with silicone to fully enclose and seal off the cavity 124 to ensure it is a watertight cavity 124. The barrier strip 138 and potting material are translucent to allow the light from the LED strips 134 to provide ambient lighting. These LED lights 134 may be selectively activated, with respect to color, on/off frequency, and intensity, by the controller to act as a signal or alarm for the personnel in the confined space 108 or on the ladder 100, as explained later. It should be noted that the barrier strip 138 is recessed in from outer face OF of the profile so as to protect the barrier strip 138 from damage or scratching.

Finally, the profile of the upright 102 ends in a fourth, inwardly-facing opening 140 and an inwardly-curving lip 142 which may be used as a handle to pick up the ladder 100, even when wearing gloves.

Figure 15:
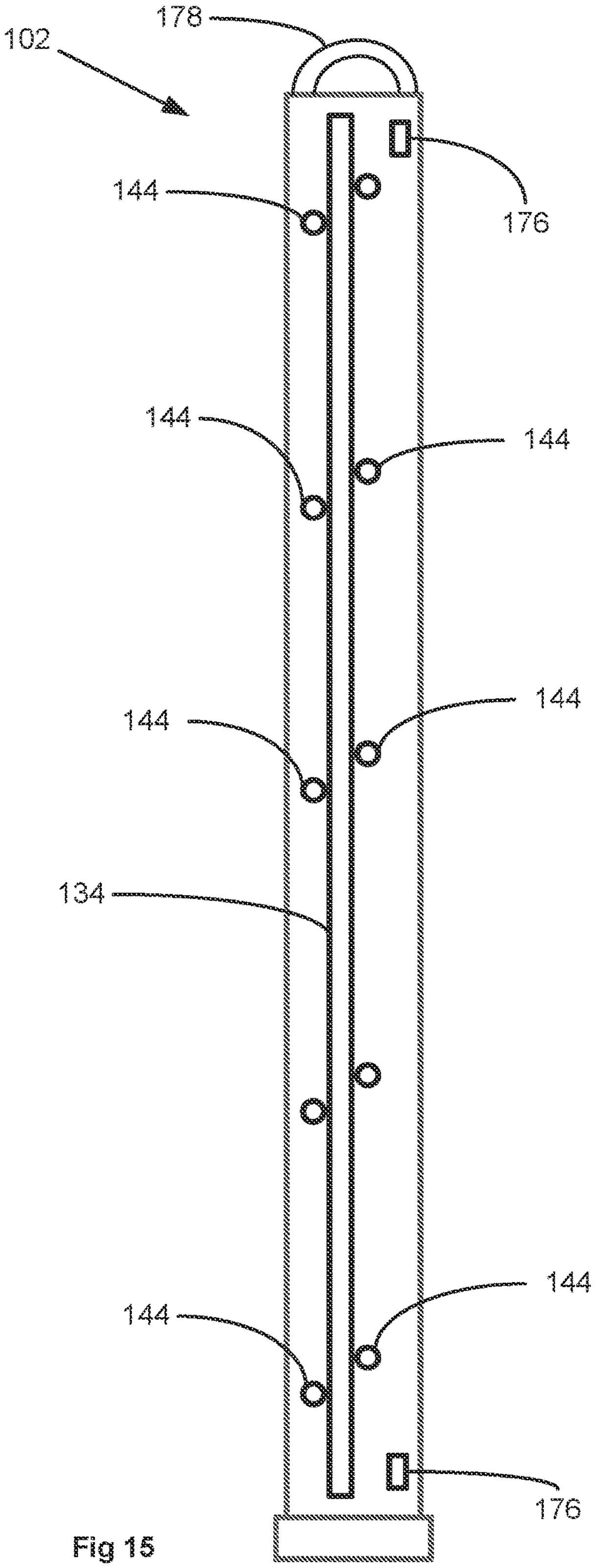
FIG. 15 is an outward-facing side view of an upright of the ladder of FIG. 11.

Referring now to FIGS. 17-22, each rung 106 spans the distance between the uprights 102, 104 and is secured to the uprights 102, 104, preferably by rivets 144 (See FIG. 15). FIG. 18 is a cross-sectional view of a rung 106 taken along line 18-18 of FIG. 17. (FIG. 17 is a front sectional view of the rung 16, but it will be understood that FIG. 18 is a view through the entire rung, not just through the portion of the rung shown in FIG. 17.) As shown in FIGS. 17 and 18, one or more batteries 146 may be housed inside the rung 106. These batteries 146 preferably are rechargeable batteries and are automatically recharged whenever the ladder 100 is plugged into an external power supply. The rung 106 defines a downwardly and rearwardly-opening, longitudinal cavity 148, extending its full length, which houses an LED strip 150 to illuminate the area behind and below the rung 106. As is the case with similar cavities in the ladder 100, this cavity 148 is closed off with a barrier strip 152, in this case a translucent strip 152, to seal off the LED strip 150 from the environment, and this cavity 148 may be potted with translucent material to render the cavity 148 waterproof.

FIG. 19 is a cross-sectional view of a rung 106 along line 19-19 of FIG. 17. (As with FIG. 18, this is a view across the entire rung 106, not just the portion of the rung shown in FIG. 17.) FIGS. 17 and 19 show that the rung 106 defines at least one opening 154 for light to shine forwardly from the rung 106, toward the person climbing the ladder, from the end of a light pipe 156. Light pipes are optical components that are typically used to increase the uniformity of a light source or to direct light. In this instance (See FIG. 23) the light pipe 156 takes the light from an LED light source 158 on one of the uprights 102, 104 and directs it to the forwardly-directed opening 154 in the rung 106. The LED light source 158 is mounted onto a circuit board, which is controlled by the controller, described later, so that it can be used to signal or alarm the user on the ladder 100. The openings 154 on the rung 106 are located at the eye level of the user when the user is standing on the ground or on a rung of the ladder, so he may readily see the signal 160 (See FIG. 23) as he ascends or descends the ladder 100.

Referring to FIGS. 18-22, the rung 106 has a nose 162 on its rear edge and tail 164 on its front edge. Extending between the nose 162 and the tail 164 is an arched top surface defining a plurality of ribs 166 to improve the grip of either a foot or a hand onto the rung 106. The tail 164 defines a first shallow concave surface 168, which serves as a thumb contact area. The nose 162 defines a second, deeper concave surface 170, opposite the first shallow contact surface 168. The user grasps the rung 106 with his thumb 306 (See FIG. 20) on the first shallow concave surface 168 of the tail 164. The remainder of his hand extends over the ribs 166 on the top surface, with his digits 308 extending into the second concave surface 170 on the nose 162. The palm of his hand lies over the grip-enhancing ribs 166. This allows the rung 106 to be gripped in a natural manner while ascending and descending especially while passing through a manway or around other obstructions When ascending and descending, users should have three points of contact for best support. This type of use requires practice and discipline. When ascending and descending a prior art ladder, the user's arms are bent at the elbow and the wrist. With a conventional rung or flat step, if a user slips and loses contact with his feet and only has contact with one or both hands, with both his wrists and elbows bent, he can become injured when his handhold arrests his fall. In the configuration described in this embodiment of the ladder 100, the user's grip keeps the wrist aligned with the forearm 172 (See FIG. 20) so that, in the event of losing foot contact, there is less stress to the wrist.

With two feet and two hands, in order to ascend or descend a prior art ladder, at least one of the four points of contact must move. In order to continue to move, each hand and foot must move but in a highly coordinated manner which is difficult for most users to master. The present invention allows the operator to create a temporary fifth point of contact 174 (See FIG. 20) to significantly improve ladder safety by preventing injury and falls.

The design of the rung 106 encourages the user to align his wrist with his forearm 172 and to extend the forearm 172 into contact with the rounded lip 130 on the entry side "F" of the ladder 100 at the point 174. This provides a means for the user to create five points of contact with the ladder as follows: Grip the rung 106, press the forearm 172 into the rounded front inner edge 130 of the upright 102 at the contact point 174 while pushing out with the opposite side foot. This establishes three points of contact with one foot, one hand, and one forearm being pressed into the rounded edge 174 of the ladder 100, leaving the other foot and the other hand free to move, giving the user better support with added mobility.

FIG. 15 shows the outer-facing "OF" side of the upright 102. The LED light strip 134 and the rivets 144 securing the rung 106 are shown. Also shown are electrical outlets 176 at the top and bottom of the upright 102. These outlets 176 may be used to energize electrical equipment, including electrical extension cords, as needed. The outlets 176 may be powered by a battery internal to the ladder 100 and/or by an external power source, as described with respect to the first embodiment. A handle 178 at the top of the ladder 100 is used to help lift and place the ladder 100 in place.

Figure 16:
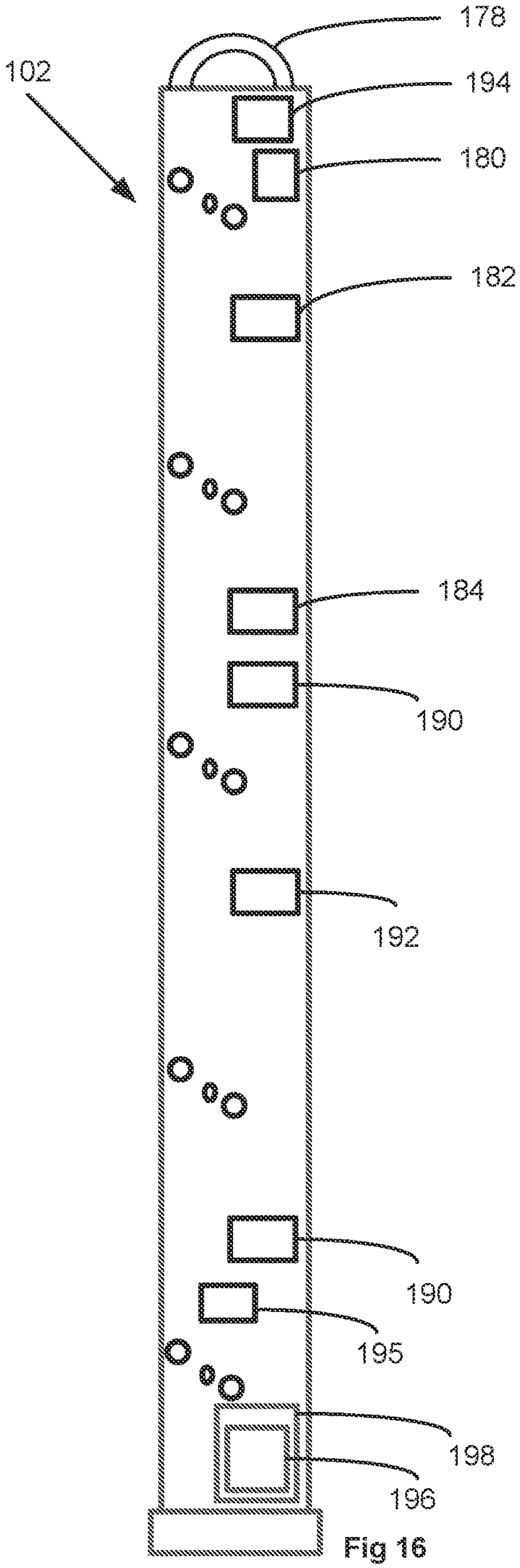
FIG. 16 is an inward-facing side view of an upright of the ladder of FIG. 11.
Figure 20:
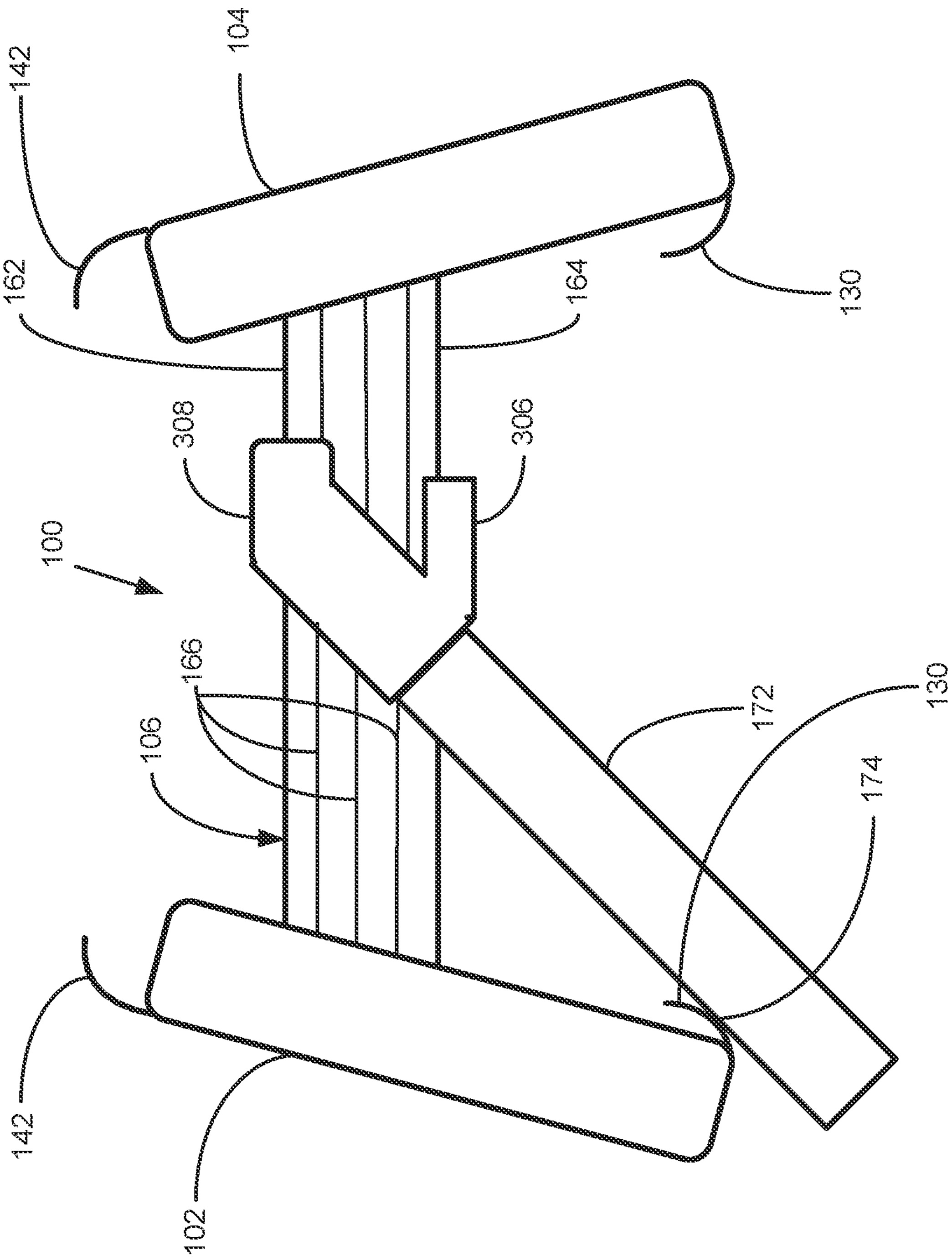
FIG. 20 is a schematic showing an arm and a hand of a user grasping a rung on the ladder of FIG. 11.
Figure 21:
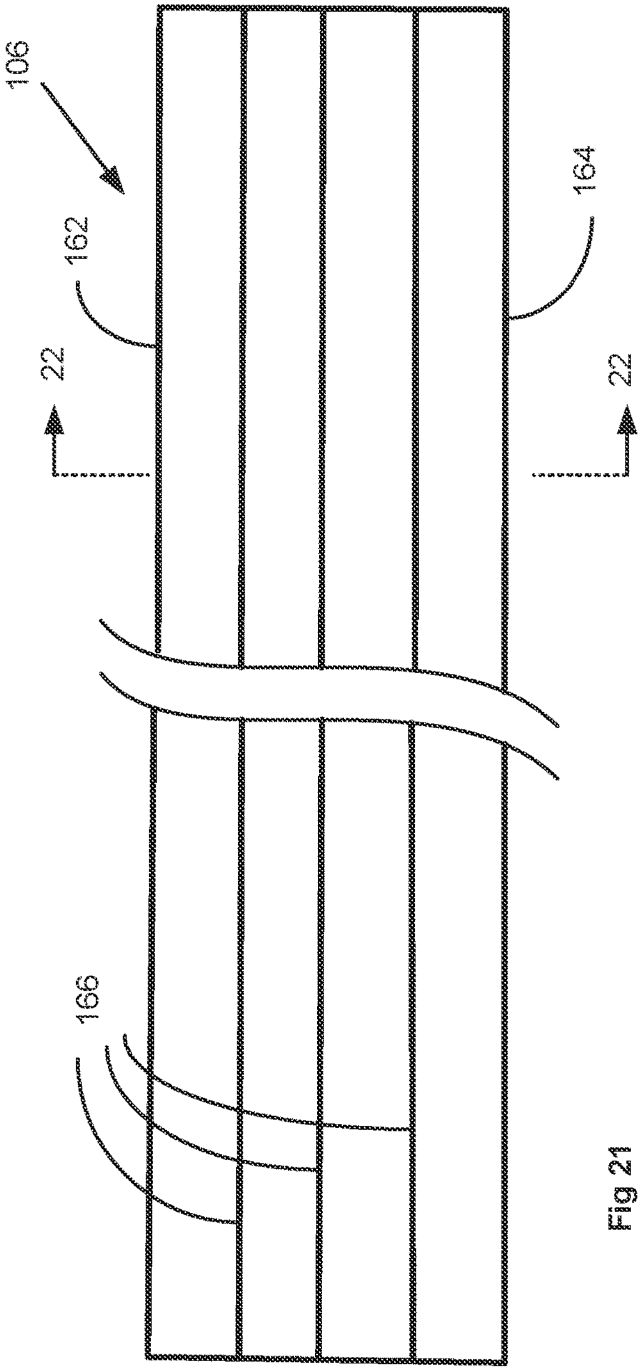
FIG. 21 is a plan view of a rung of the ladder of FIG. 11.
Figure 22:
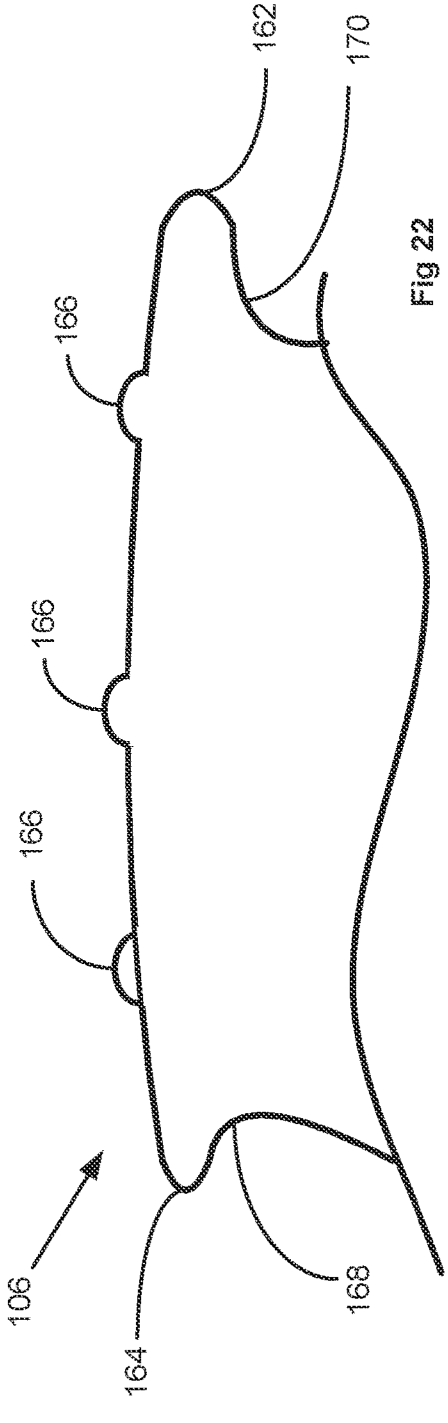
FIG. 22 is a broken-away view along line 22-22 of FIG. 21, showing just the outer profile of the rung.

FIG. 16 shows the inner-facing "IF" side of the upright 102. This upright includes several accessories, many of which may be present in both uprights 102, 104, and are described below. Many of these accessories communicate to a receiver outside of the confined space, which will be described later. The accessories are as follows:

RFID reader 180: Ladders are used in some spaces that involve many entrants at the same time. The same entrants may enter and exit the space many times during a work period. If the workspace is an OSHA Permit Required Confined Space, such as the space 108 in FIG. 13, an attendant located outside the confined space 108 is required to record and keep track of entrants, the entrants' names, when they enter, when they exit, and the duration of their stay inside the area. The attendant also may be tasked with double-checking that the entrant has an ID and all the certification required to enter such a confined space 108. This is a tedious and time-consuming process. In this embodiment, a unique radio frequency identification card (RFID) containing most of this information is issued to each entrant prior to entry. Upon entering or exiting the space, the entrant scans his RFID card on the RFID reader 180 to log his status. A remote device (such as the printer 280 of FIG. 28) connected to the ladder 100 records and prints the name of the entrant, entry or exit as appropriate, and the time and date of entry or egress. One RFID reader 180 on one upright 102 is used for ingress and a second RFID reader 180, located on the opposite upright 104, is used for egress. This automates and speeds up the logging of workers going into and out of the confined space.

Man Down Plug 182: An attendant or an entrant can pull a plug 182 from the upright 102 to indicate that there is a man down. This signals the controller to activate alarms both inside and outside the confined space to initiate action by emergency response personnel.

Four (4) gas monitor 184: A 4-gas monitor 184 is incorporated into the ladder 100 to eliminate the need for a sample hose to be routed through the manway 110. In practice, the sample hose often becomes pinched when personnel or equipment enter or exit the space 108 at the point they are passing through the manway 110. During this time, the atmosphere inside the controlled space cannot be monitored. This gas monitor 184 eliminates the problem of the pinched sample hose by monitoring the gas on site and eliminating the sample hose.

Figure 23:
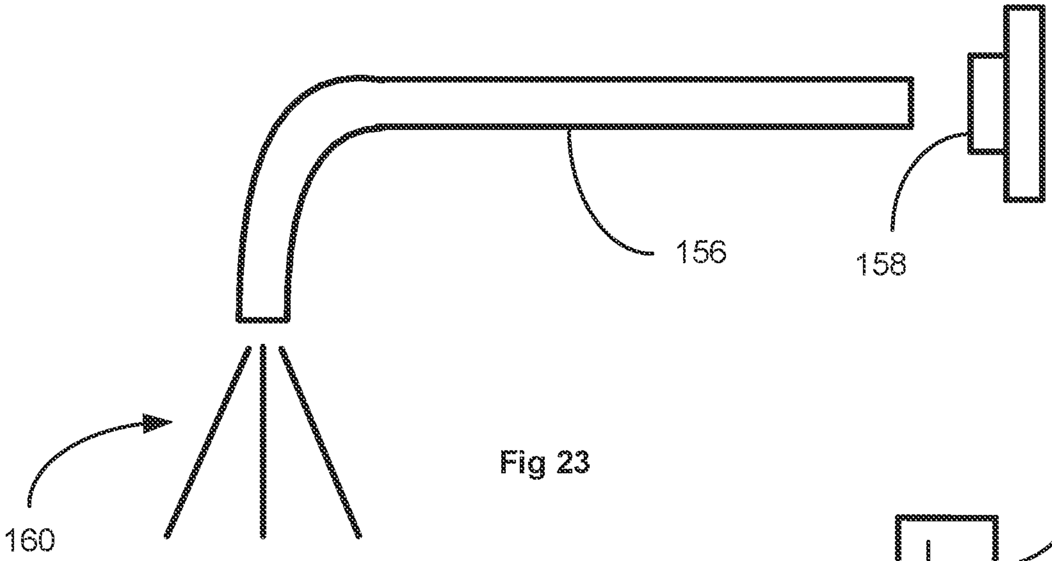
FIG. 23 is a schematic, front view of a light pipe transmitting light rays from an LED light source.
Figure 23A:
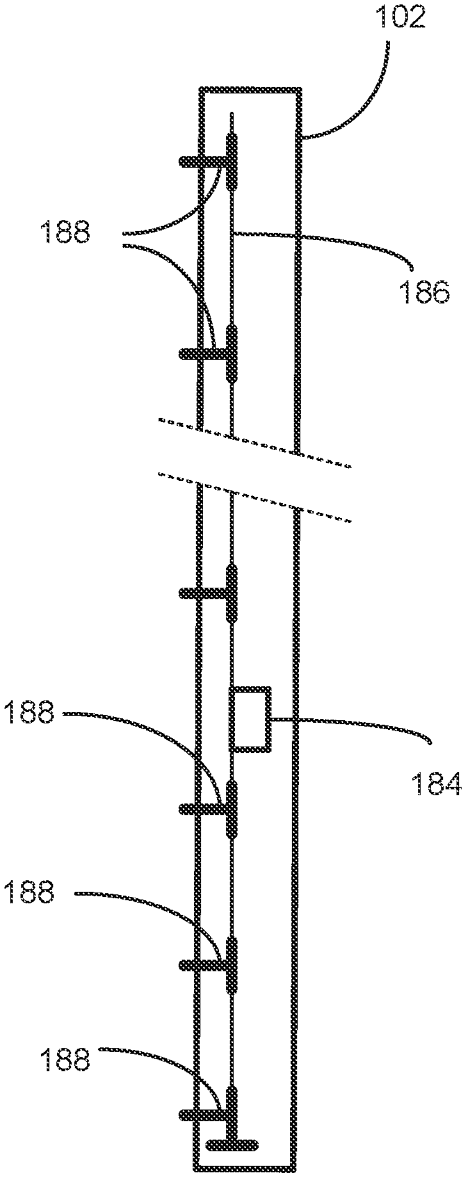
FIG. 23A is a broken-away side view of an upright showing an alternate embodiment of a gas-sampling arrangement on the ladder of FIG. 11.

FIG. 23A shows an alternate embodiment of an arrangement for monitoring the atmosphere by the 4-gas monitor 184. In this arrangement, a manifold 186 extends the length of the upright 102, and a plurality of 3-way valves 188 are opened up sequentially by the controller, while the remaining 3-way valves remain closed, to draw a sample of the atmosphere around the ladder 100 at a number of elevations along the height of the ladder 100. The 4-gas monitor 184 may be located at any convenient place on the ladder 100, in fluid communication with the manifold 186 and therefore with the 3-way valves 188. In a preferred embodiment, the 4-gas monitor 184 is readily accessible and removable so it may be taken for calibration. The readings of the 4-gas monitor 184 are transmitted to the controller, which may generate alarm outputs both inside and outside the confined space to prompt evacuation of the confined space if an unsafe condition is sensed by the monitor 184.

Speaker/Vibrator 190: Referring again to FIG. 16, one or more speakers/microphones 190 are included to provide audible communication between people inside and outside the confined space 108. A vibrator (also at 190) also may be used to alert entrants when they are in physical contact with the ladder 100 as sensed by the contact sensors 36 described with respect to the first embodiment and also present in this embodiment.

Cameras 192: Video cameras 192 allow the attendant and others to be in visual communication with entrants to ensure their safety, needs, and progress. In a preferred embodiment, the video cameras 192 are capable of recording in IR (infra-red) frequencies so they are able to record events and personnel even at night or when the visibility in the confined space 108 is very poor, due to smoke for instance. In this instance, at least some of the LED lights 134 may shine light in the IR frequencies. These cameras 192 may be wide-angle cameras to capture more of the work space area.

Plug Receiver 194: A plug receiver 194 mounted near the top end of the ladder 100 is designed to fit a custom shaped plug for powering the ladder 100 and charging its batteries 146. (There also may be a plug receiver 194 near the bottom end of the ladder, if desired.)

Circuit board 196: A custom circuit board 196 with a gasket cover 198 is used to communicate with various components, including the following:

Computer—to control and manage the various sensors, transducers, LEDs, battery charging, RFID, monitoring and reporting to a remote data input/output device.

Video input/output—to process video data from the cameras 192 and transmit to outside the space 108.

DC-response accelerometer to measure the angle $\alpha$ of incline to be used by the computer to alert the user via speaker, vibrator, and/or flashing lights that the ladder 100 is not at the proper incline angle.

LED lights to provide ambient lighting as well as lights at a location directly beneath the bottom most rung with LEDs being directed inward where a person's feet will be before ascending the ladder 100 and where the feet will first contact a floor or other surface when descending.

Bluetooth or other wireless link to provide a communication link between the ladder 100 and another device, such as a laptop or other communication device.

Figure 27:
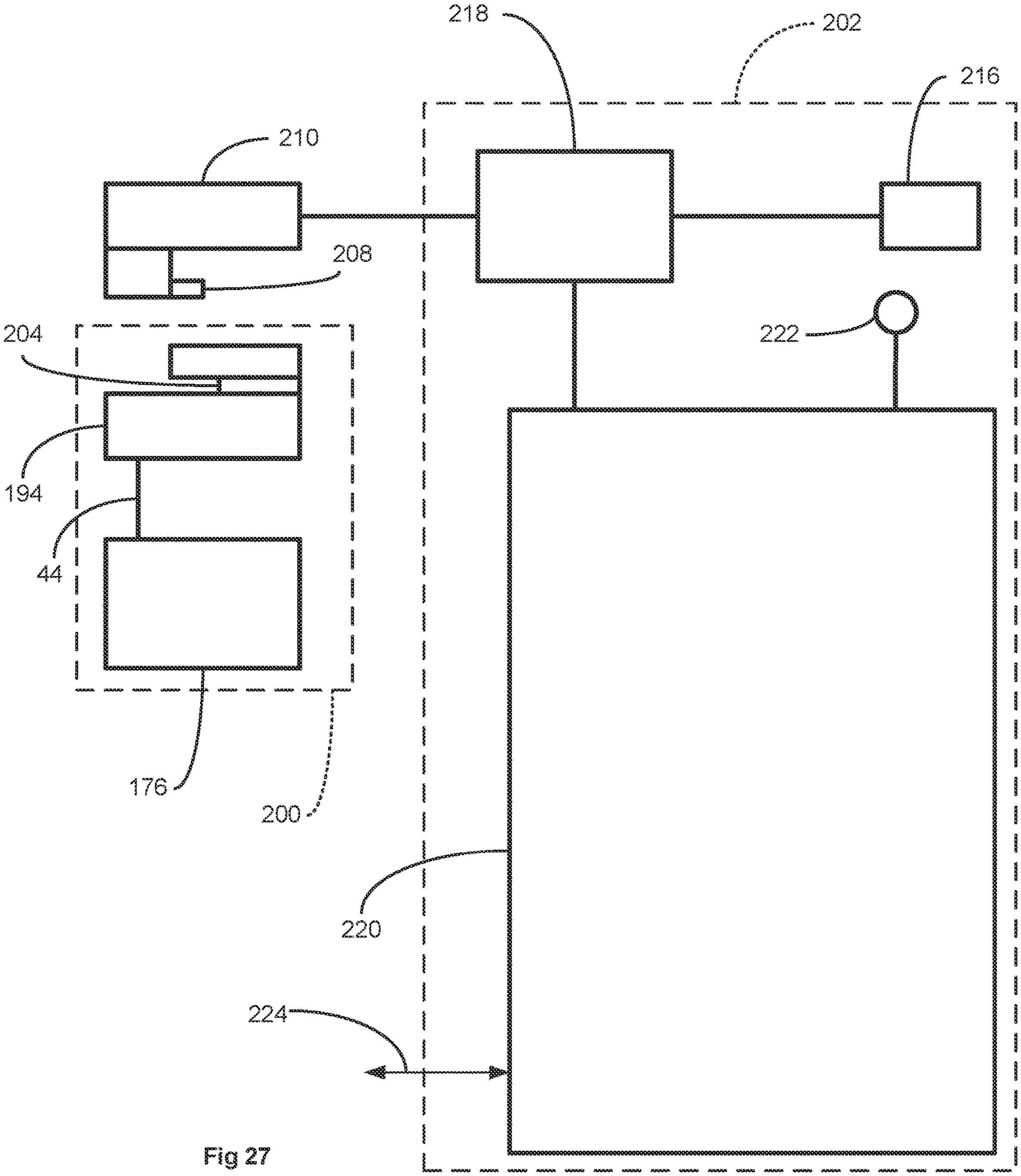
FIG. 27 is a schematic showing which components would typically be located inside and which components, including the attendant box, would be located outside the confined space of FIGS. 13 and 14.

Schematic:

FIG. 27 is a schematic showing components which would be located inside the confined space depicted by the dashed line 200, and which components, including the attendant box, would be located outside the confined space, as depicted by the dashed line 202. Some components, which are not located inside either dashed line 200, 202, may be located either inside or outside of the confined space.

Figure 14:
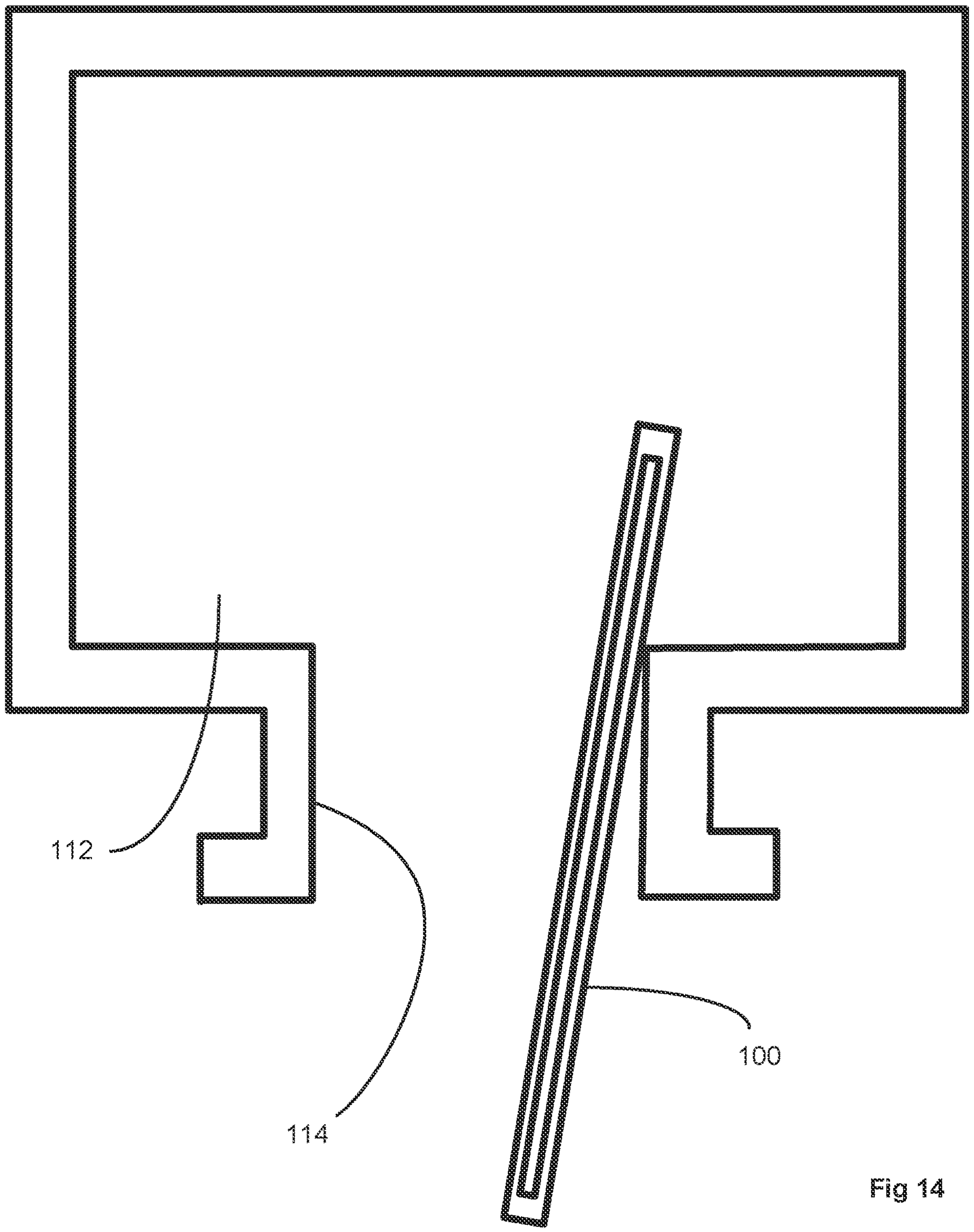
FIG. 14 is a side view of the ladder of FIG. 11 set up to be inserted upwardly into a confined space.

As was shown in FIGS. 13 and 14, the ladder 100 is located mostly inside the confined space 108. As explained with respect to FIG. 16, there is a connector 194 on the ladder, for connecting outside power to the ladder 100. FIG. 27 shows that the connector 194 on the ladder is a special connector with a keyway 204, which receives power by connecting to a plug 210 having a mating key 208, which connects into the keyway 204 on the connector 194. This energizes the ladder, typically with 24 VDC power. A cord 44 internal to the ladder, as described with respect to the first embodiment, then powers accessories, such as LED lights, battery chargers, gas monitor, cameras, tiltmeter, circuit boards, computer, Bluetooth link, RFID's, load cells, and speakers, which may be internally connected to the cord 44 or may be plugged into the ladder's outlets 176, which are connected to the cord 44. The plug 210 may be located inside or outside the confined space 108 depending on the placement of the ladder 100.

Outside the confined space, as shown by the dashed line 202, there is a 100-240 VAC power supply 216, a regulated, 24 VDC Universal Power Supply 218, and an attendant box 220 which may be implemented, for example, as a personal computer, a tablet, a virtual touch-pad device, or even a conventional control panel. The attendant box 220 includes an antenna 222 for Bluetooth communications, and may include cables or other connectors 224 for remote, hard wired communications. These Bluetooth communications and hard wired communications may be with the ladder 100 inside the enclosed space or with devices, outside the enclosed space. It is expected that the attendant box 220 also will include some hardware such as emergency buttons to be pressed when necessary, without having to scroll through a menu screen.

Figure 28:
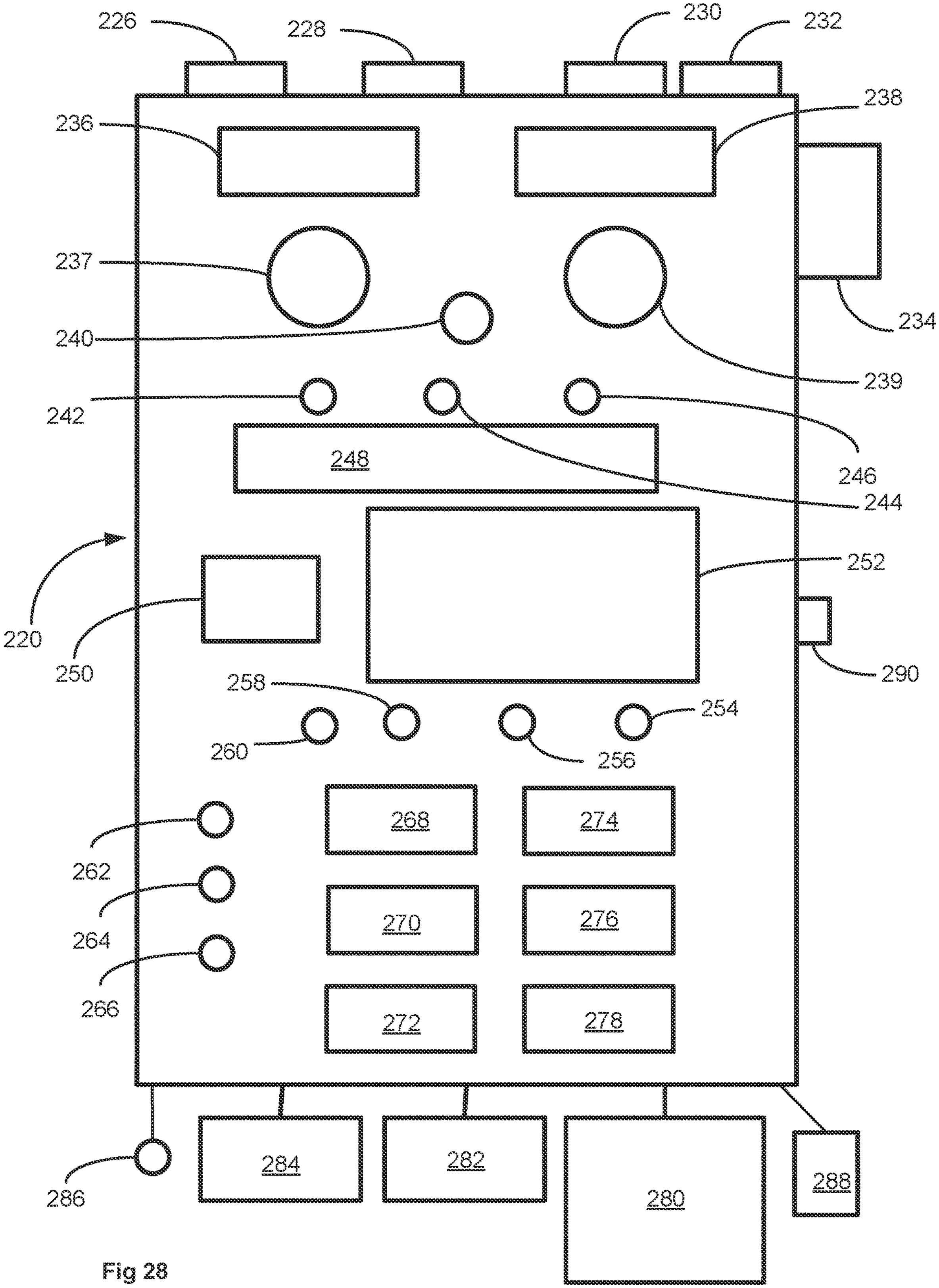
FIG. 28 is a front view of the attendant box of FIG. 27.

Attendant Box:

FIG. 28 shows an example of an attendant box 220, which includes the following:

Entrant Alert Button 226: Pressing this button provides a signal or signals to entrants that there is an urgent need to communicate with entrants, such as to have an entrant go to the manway for a verbal instructions.

Exit Now Button 228: Pressing this button will cause an alarm inside the enclosed space, such as causing the LEDs on the ladder 100 to flash red, the speaker or buzzer to sound, and a message to play "Exit Now".

Man Down Button 230: Pressing this button will alert emergency responders that there is a man down in the confined space.

Emergency Hailer Button 232: Pressing this button will sound a hailer 234

Time of Day Clock 236: Displays local time

No Entry Light 237: Red light, exit now

Permit Valid remaining Clock 238: Displays countdown timer showing remaining time that the confined entry permit is valid.

OK for Entry Light 239: Green light indicating that the confined space is ready for entry Camera that shows attendant 240: This camera is directed toward the attendant and transmits video to other locations in order to confirm that the attendant is present.

Lights for the 4 gas monitors:

Hi level alarm light 242: red—initiate Exit Now

No flow light 244: Yellow, 4 gas monitor air pump not detecting flow—activate beeping sound Atmosphere light OK 246: green Four gas level monitor display 248: Displays the values of all gases being monitored Entrant Count 250: Displays total number of people in the confined space Entrant Data display and video monitor 252: Shows the names of the entrants and how long each entrant has been inside the confined space. Note: This monitor can be switched to be a video monitor showing the video images from the cameras 192 on the ladder 100.

Sensor Warning lights which include:

Interior noise level 254

Interior Dust level 256

Interior stress level 258

AC power down 260

Ladder line powered 262: green

Ladder on Battery 264: Yellow

Ladder battery power low 266: red

Digital displays include:

Inside temperature 268

Inside humidity 270

Inside heat stress 272

Outside temperature 274

Outside Humidity 276

Outside heat stress 278

Other external connections include:

Connection to a printer 280

Connection to a microphone 282

Connection to a headset 284

Connection to an antenna 286

Connection for a Data cable 288

Connection for 24V DC input 290

Any or all of the data transmitted to or from the controller may be transmitted to the attendant box 220 via the antenna 286. The attendant box 220 also includes a transmitter, which enables the attendant box 220 to transmit data or commands to the controller mounted on the ladder. For example, when the exit now button 228 is pressed, the attendant box 220 generates a signal that is transmitted to the controller to generate signals emitted from the ladder to let any people in the confined space know they need to exit immediately.

Figure 24:
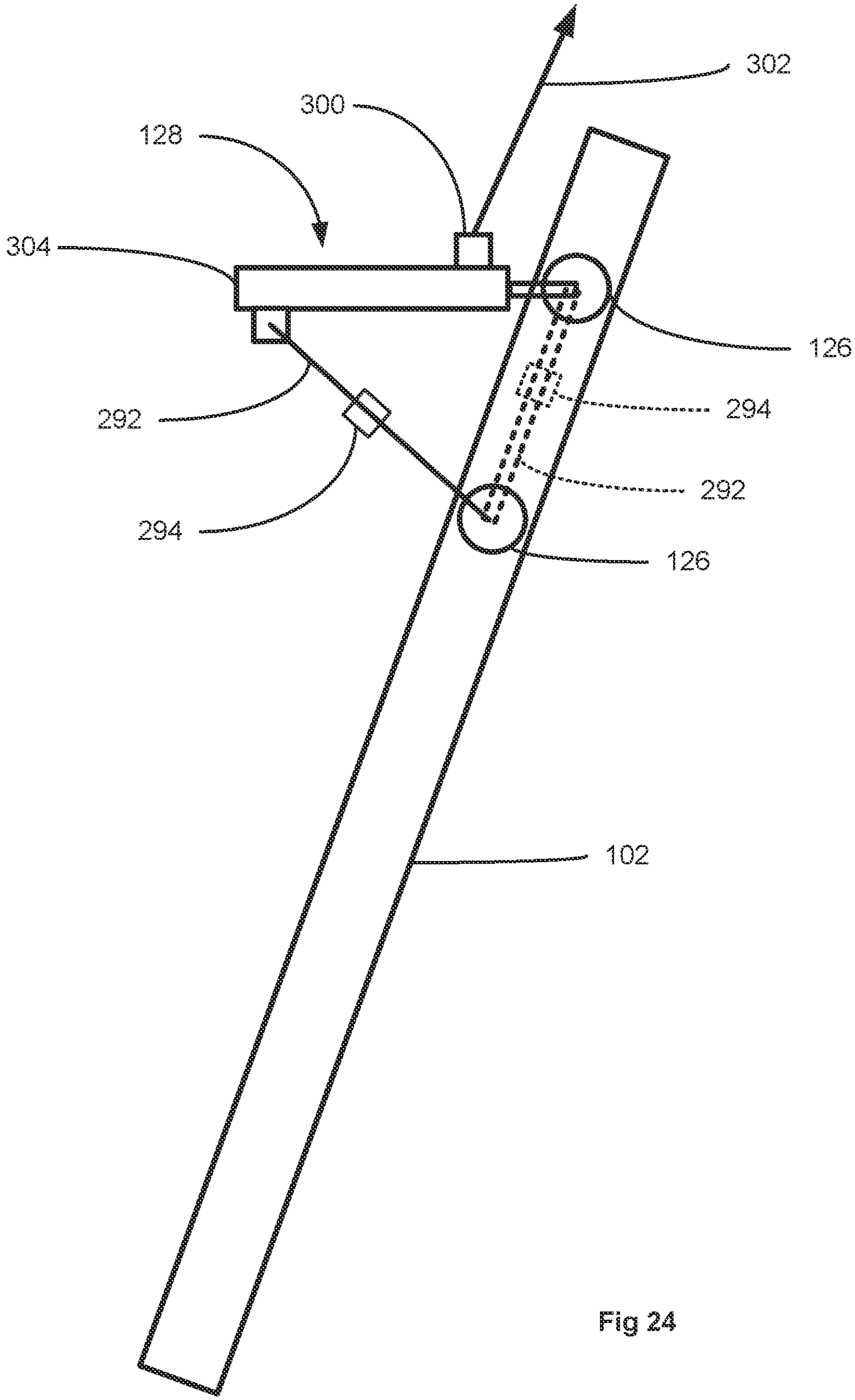
FIG. 24 is a side view of a movable cargo tray which can be mounted onto the the ladder of FIG. 11.
Figure 25:
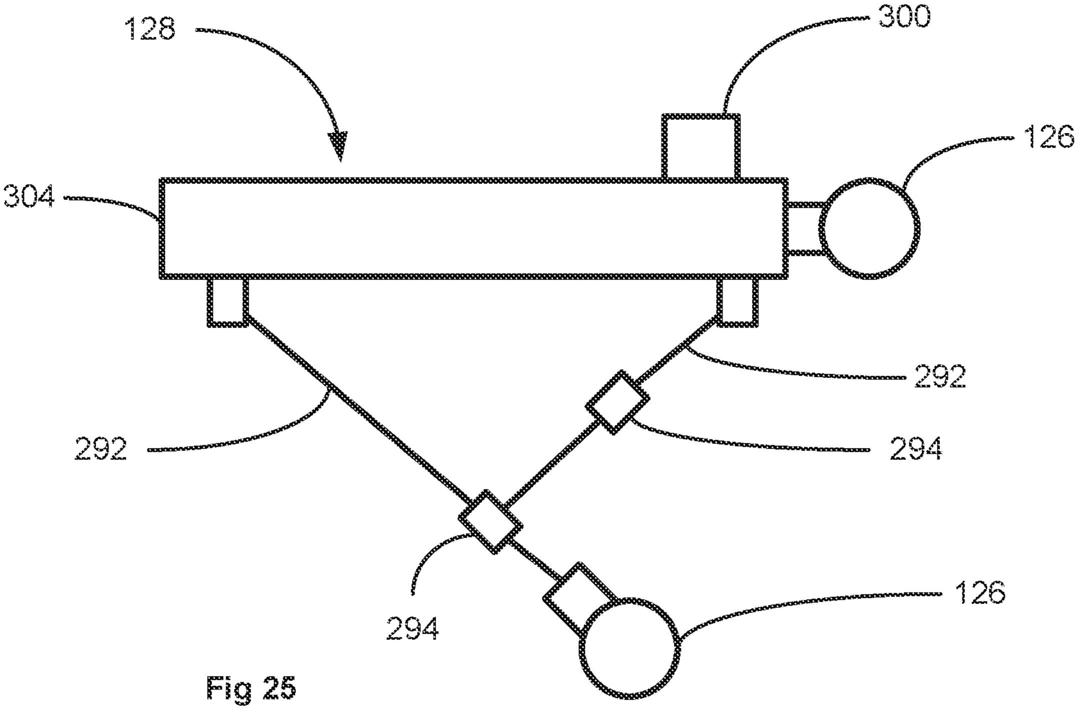
FIG. 25 is an enlarged side view of the movable cargo tray of FIG. 24.
Figure 26:
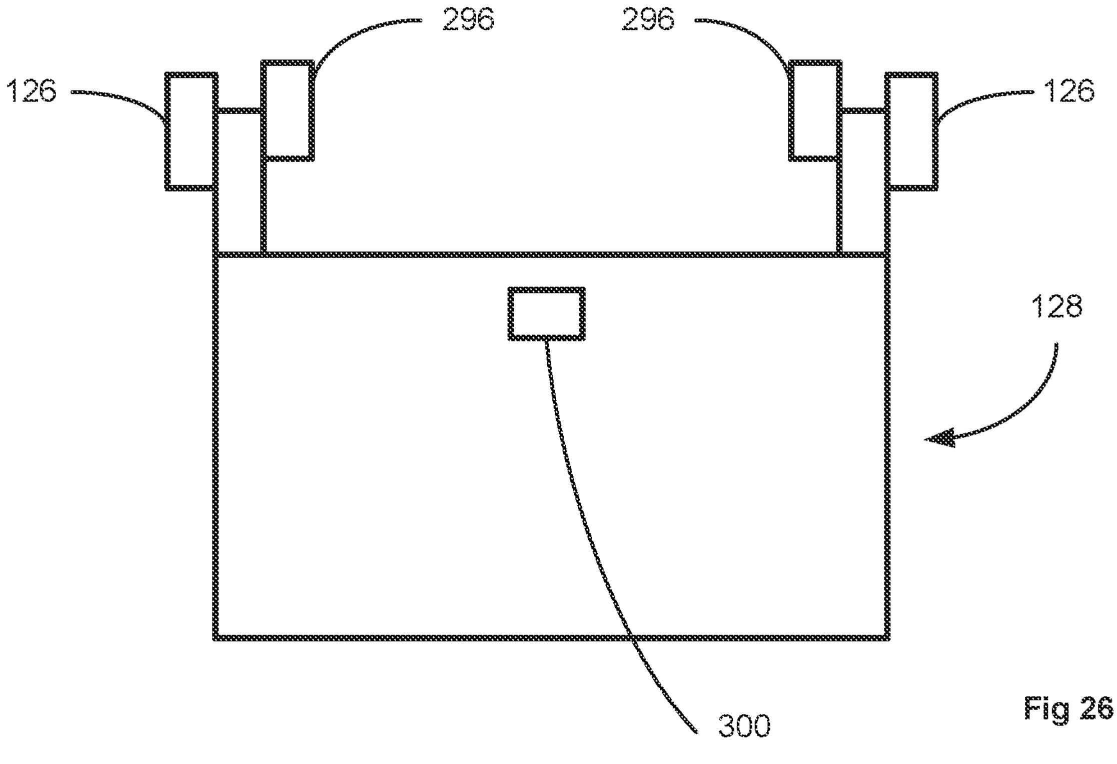
FIG. 26 is a plan view of the movable cargo tray of FIG. 25.

FIGS. 24-26 show a movable cargo tray 128, which can be mounted on the ladder 100 for lifting or lowering loads without the need to have a person on the ladder 100. The tray 128 rides on bearings 126, which travel along the cavities 120 on the left and right uprights 102, 104, as shown in FIG. 11. As shown here, there is a pair of upper and lower bearings 126 on each side of the tray 128, with one pair of upper and lower bearings 126 received in each upright 102, 104, respectively. As best appreciated in FIG. 25, the tray 128 is connected to the left and right lower bearings 126 via left and right rods 292 having intermediate turnbuckles 294, which can be adjusted to ensure that the tray 128 is substantially horizontal regardless of the angle of repose a (See FIG. 10) of the ladder 100.

As shown in FIG. 26, the tray 128 includes cam locks 296 designed to lock the tray 128 against the wall of the cavity 120 to prevent travel along the cavity 120. The cam locks 296 press against the wall in the area 298 shown in FIG. 11. Of course, other braking/locking mechanisms could be used instead of, or in addition to, the cam locks 296. The tray 128 also includes an anchor point 300 so that a rope 302 or pole can be secured to the tray 128 from an elevated position above the tray 128 to raise or lower the tray 128. The tray 128 may have elevated sides 304 to prevent items on the tray 128 from falling off.

It will be obvious to those skilled in the art that modifications may be made to the embodiment described above without departing from the scope of the present invention as claimed.

What is claimed is:

1. A ladder, comprising:

left and right uprights interconnected by a plurality of rungs, including a bottommost rung, a bottom rung sensor which senses when a user is standing on the bottommost rung of the ladder;

a plurality of contact sensors on said plurality of rungs;

a controller, mounted on said ladder, which is in communication with said bottom rung sensor and said plurality of contact sensors;

wherein the controller activates an output signal mounted on the ladder to indicate whether a user is on the bottommost rung; and wherein the controller determines, based on inputs received from the plurality of sensors, if the user has three points of contact with said plurality of contact sensors.

2. A ladder as recited in claim 1, wherein said bottom rung sensor comprises an optical receiver mounted on one of said uprights and a transmitter mounted on the other of said uprights, said optical receiver and transmitter being mounted a short distance above the bottommost rung.

3. A ladder as recited in claim 1, wherein said controller generates an output signal on said ladder to let a user know whether the user has three points of contact with said contact sensors.

4. A ladder as recited in claim 1, and further comprising outwardly facing, elongated channels in said left and right uprights, and outwardly-shining light strips extending along said outwardly facing channels and sealed within said outwardly facing channels, said outwardly-shining light strips being in communication with said controller.

5. A ladder as recited in claim 1, wherein said left and right uprights are canted so they diverge from each other on a front side and converge toward each other on a rear side.

6. A ladder as recited in claim 5, wherein said rungs are offset toward said rear side of said left and right uprights.

7. A ladder as recited in claim 1, wherein said left and right uprights define an elongated direction and define a plurality of channels extending in said elongated direction, wherein at least one of said channels receives wiring and is potted to seal off said wiring from water damage, and wherein the controller mounted on said ladder is in communication with said wiring.

8. A ladder as recited in claim 7, and further comprising an on-board battery mounted on said ladder in communication with said wiring.

9. A ladder as recited in claim 8, wherein said on-board battery is mounted in a hollow inner portion defined by one of said rungs.

10. A ladder as recited in claim 9, and further comprising an RFID reader mounted at one end of said ladder for sensing the movement of users onto said ladder.

11. A ladder as recited in claim 8, wherein said ladder includes a telescoping mast.

12. A ladder as recited in claim 8, wherein said ladder includes a gas monitor in communication with said wiring.

13. A ladder as recited in claim 8, wherein said ladder includes a Bluetooth link and a camera in communication with said wiring.

14. A ladder as recited in claim 8, wherein said ladder includes a movable cargo tray which rolls up and down along at least one of said elongated channels.

15. A ladder as recited in claim 8, wherein said ladder includes a speaker and a microphone in communication with said wiring.

16. A ladder as recited in claim 8, wherein said ladder includes a vibrator in communication with said wiring.

17. A ladder as recited in claim 8, wherein said ladder includes a camera in communication with said wiring.

18. A ladder, comprising:

left and right uprights interconnected by a plurality of rungs, wherein said left and right uprights are canted so they diverge from each other on a front side and converge toward each other on a rear side, wherein said rungs are offset toward said rear side of said left and right uprights.

19. A ladder as recited in claim 18, wherein said left and right uprights define an elongated direction and define a plurality of channels extending in said elongated direction, wherein at least one of said channels receives wiring and is potted to seal off said wiring from water damage, and further comprising a controller mounted on said ladder in communication with said wiring.

20. A ladder as recited in claim 19, and further comprising the following accessories mounted on said ladder in communication with said wiring: a gas monitor; a camera; a battery; a wireless communication link; a speaker; a microphone; and an RFID reader.

* * * * *